(12) United States Patent
Hirokazu et al.

(10) Patent No.: US 7,034,149 B2
(45) Date of Patent: Apr. 25, 2006

(54) CYAN DYE MIXTURE, WATER-BASED CYAN INK COMPOSITION, AND METHOD OF INK-JET RECORDING

(75) Inventors: Kitayama Hirokazu, Saitama (JP); Shinichi Namba, Tokyo (JP); Takafumi Fujii, Saitama (JP); Junji Otani, Saitama (JP); Junko Yoshioka, Tokyo (JP); Yasuo Shirasaki, Saitama (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 214 days.

(21) Appl. No.: 10/333,418

(22) PCT Filed: Jul. 25, 2001

(86) PCT No.: PCT/JP01/06403

§ 371 (c)(1),
(2), (4) Date: Jan. 17, 2003

(87) PCT Pub. No.: WO02/08340

PCT Pub. Date: Jan. 31, 2002

(65) Prior Publication Data

US 2003/0164114 A1    Sep. 4, 2003

(30) Foreign Application Priority Data

Jul. 26, 2000   (JP) ............................. 2000-226146

(51) Int. Cl.
*C07B 47/00*   (2006.01)
*C07F 5/10*   (2006.01)

(52) U.S. Cl. ...................................... 540/145; 534/15

(58) Field of Classification Search ............... 540/145; 534/15
See application file for complete search history.

(56) References Cited

U.S. PATENT DOCUMENTS 2,300,572 A   11/1942   Hoyer et al. ............... 260/314

FOREIGN PATENT DOCUMENTS

JP   62-190273   *   8/1987
JP   7-138511    *   5/1995

* cited by examiner

*Primary Examiner*—James O. Wilson
*Assistant Examiner*—Paul V. Ward
(74) *Attorney, Agent, or Firm*—Nields & Lemack

(57) ABSTRACT

The present invention relates to a cyan dye mixture, an ink composition containing the mixture and a method of ink-jet recording with the ink composition. The print obtained by the method is characterized by discoloring or fading little even when allowed to stand in a well ventilated shade or in an ozone gas. The cyan dye mixture comprises compounds which are obtained by chlorosulfonating, as a starting material, copper phthalocyanine or a sulfonated copper phthalocyanine and then aminating the chlorosulfonation product with an aminating agent used in an amount of at least 2.5 mol per mol of the starting material, and which are represented by the following formula (1):

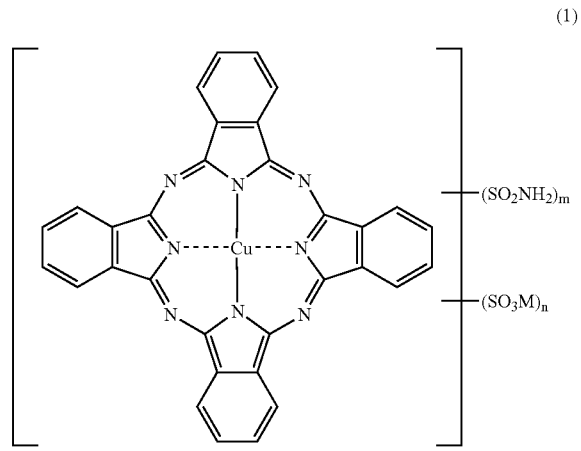

wherein M represents a proton, alkali metal ion, alkaline earth metal ion, onium ion of an organic amine, or ammonium ion; m is an integer of 1 to 4; and n is an integer of 0 to 3; provided that m+n is an integer of 1 to 4.

8 Claims, 12 Drawing Sheets

—— Example 1
— — Example 4
▪ ▪ ▪ ▪ Example 11

Comparative example 1

CYAN DYE MIXTURE, WATER-BASED CYAN INK COMPOSITION, AND METHOD OF INK-JET RECORDING

TECHNICAL FIELD

The present invention relates to a cyan dye mixture, water-based cyan ink composition and method of ink-jet recording.

BACKGROUND ART

Diverse ink jetting processes have been developed for the recording method by means of ink-jet printer, and any process comprises generating ink droplets to deposit them onto various recording materials (such as paper, film, cloth) for recording. The recording method by means of ink-jet printer is characterized by generating no sound, thus being silent and being able to print character on rough surface, soft material, fragile products and the like in any place due to the system in which a recording head does not contact with the recording material and the method has rapidly been spread in recent years and will be propagated in future because the method advantageously allows the printer to become downsized, to work in a high-speed and to give color printing, easily. For recording an image information or a character information pictured on a computer color display in color by means of an ink-jet printer, the information is generally printed according to subtractive color mixing of inks of four colors, namely black (K) plus trichromatic color of yellow (Y), magenta(M) and cyan(C). In order to print reproductively an image pictured by additive color mixing of R(red), G(green), B(blue) on a CRT display as faithfully as possible according to subtractive color mixing, the dyestuffs used, especially ones for a YMC ink, are desired to have color hues close to the respective standards of YMC and vividness. Additionally, it is required that the resulting ink composition is stable for long-term storage and that the resulting printed image is of a high optical density and has excellent fastness including water fastness and light fastness. Where the ink composition is applied to displays such as advertisements to spread the usable fields, the printed articles increases opportunities to be exposed to light (electric light, fluorescent light, sun light and the like). Hence, a demand exists for an ink composition particularly excellent in light fastness.

Many of the cyan ink compositions employ phthalocyanine dyes such as C. I. Direct Blue 86 or C. I. Direct Blue 199, which has higher light fastness than those of magenta and yellow dyes. Unfortunately, if a commonly used phthalocyanine dye such as C. I. Direct Blue 86 or C. I. Direct Blue 199 is used for printing a coated paper generally called glossy paper and then the resultant print is allowed to stand in a well ventilated shade for a long time (hereinafter referred to as "exposure to weather"), the print is soon discolored or faded. Although an exact cause is not known, the discoloration of the dye seems to be induced by interaction between ozone gas in the atmosphere and an inorganic substance and/or a polymer applied to the coated paper. The cyan dye suffers the greatest degree of discoloration, having the lowest level of color fastness. For this reason, water-based cyan ink compositions have not been yet provided as products to fully satisfy the market demand.

The application of the ink-jet printers has been extended from compact printers for office automation to large printers for industrial use. Accordingly, the prints produced by these printers are more likely to be exposed to outside weather so that higher water fastness and light fastness than ever are required. The water fastness may be notably improved by coating inorganic fine particles capable of adsorbing dye particles in ink, such as of silica, a cationic polymer, alumina or a ceramic with a PVA resin on a paper surface. A phthalocyanine dye for cyan is superior to other magenta and yellow dyes in light fastness and hence, is not studied so much as magenta and yellow dyes to improve the light fastness. However, the cyan dye used in the art is discolored or faded if it is used to print the coated paper which is called the glossy paper and then the resultant print is allowed to stand under exposure to weather or ozone gas. To overcome this problem, after printed the prints are laminated for suppressing the discoloration. However, this method has large problems in terms of time efficiency, convenience and cost. As a fundamental solution to these problems, it is an important object to develop a cyan dye which is less susceptible to discoloration under exposure to weather or ozone gas.

A typical skeleton of the cyan dye for use in the water-based ink composition for ink-jet recording is a triphenylmethane series or a phthalocyanine series. Triphenylmethane dyes exhibit favorable hues but are seriously inferior in water fastness and light fastness. In addition, there is a problem that the dyes, after printed on the glossy paper, are discolored or faded under exposure to weather or ozone gas.

On the other hand, the phthalocyanine dyes used in the art are superior in hue, water fastness and light fastness but have a problem that the dyes, after printed on the glossy paper, are discolored or faded under exposure to weather or ozone gas.

It is an object of the invention to provide a cyan ink composition having a color, hue and vividness suitable for ink-jet recording, providing a print excellent in light fastness and water fastness, and suffering less discoloration under exposure to weather or ozone gas after printed on the glossy paper.

The inventors have examined C. I. Direct Blues 199 synthesized under different conditions thereby finally obtained a cyan dye mixture and a cyan ink composition less prone to discolor or fade under exposure to weather or ozone gas after printed on the glossy paper. Thus was accomplished the invention.

DISCLOSURE OF THE INVENTION

The present inventors have made intensive study to solve the above problem and finally accomplished the invention. That is, the invention relates to:

(1) A cyan dye mixture comprising a mixture of compounds which are obtained by chlorosulfonating copper phthalocyanine and then amidating the chlorosulfonation product with an aminating agent used in an amount of at least 2.5 mol per mol of the copper phthalocyanine as a starting material, and which are represented by the following formula (1):

Formula (1)

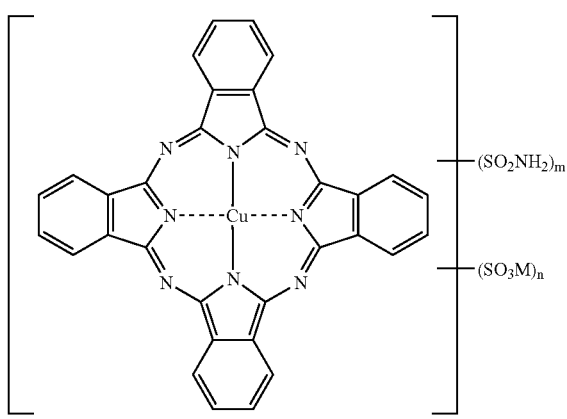

wherein M represents a proton, alkali metal ion, alkaline earth metal ion, onium ion of an organic amine, or ammonium ion; m is an integer of 1 to 4; and n is an integer of 0 to 3; provided that m+n is an integer of 1 to 4;

(2) A cyan dye mixture comprising a mixture of compounds which are represented by the formula (1) and obtained by reacting a compound represented by the following formula (2) with a chlorinating agent for chlorosulfonating its sulfonic acid group, and then amidating the chlorosulfonation product with an aminating agent used in an amount of at least 2.5 mol per mol of the compound of the formula (2):

Formula (2)

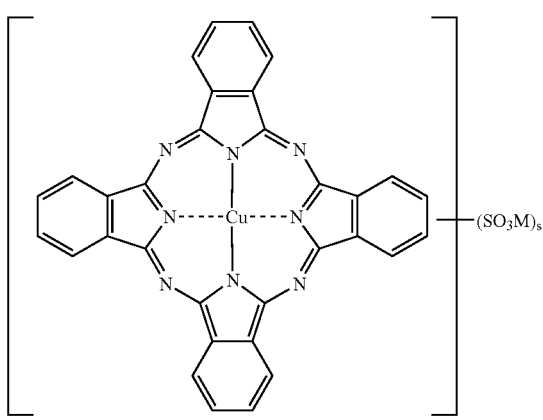

wherein M represents a proton, alkali metal ion, alkaline earth metal ion, onium ion of an organic amine, or ammonium ion; and s is an integer of 2 to 4;

(3) A cyan dye mixture comprising a mixture of compounds which are represented by the following formula (1):

Formula (1)

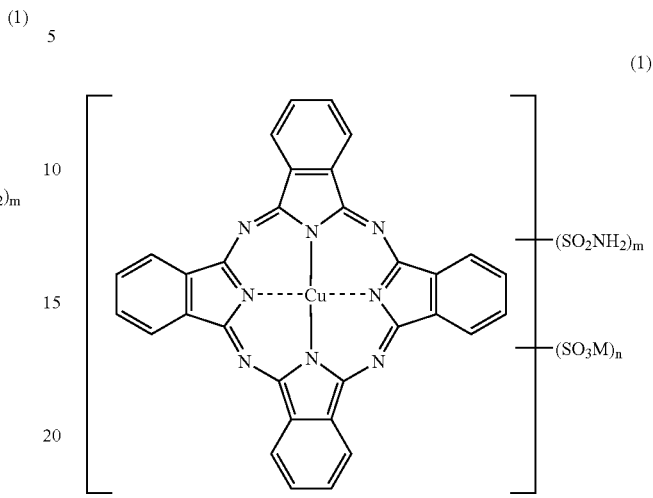

wherein M represents a proton, alkali metal ion, alkaline earth metal ion, onium ion of an organic amine, or ammonium ion; m is an integer of 1 to 4; and n is an integer of 0 to 3; provided that m+n is an integer of 1 to 4, and which have λmax in a 590–630 nm region and no peak in a 640–670 nm region of an absorption curve as spectrophotometrically measured in water with concentrations thereof adjusted to 0.01 g/l;

(4) A cyan dye mixture as set forth in (1) or (2), containing a compound having absorption peaks in a 615–640 nm region and 655–680 nm region of an absorption curve as spectrophotometrically measured in N,N-dimethylformamide with absorbance adjusted from 1 to 2 Abs;

(5) A cyan dye mixture as set forth in (1) or (2), containing a compound having a "D-C" value of not more than 48 nm wherein C represents a wavelength of an absorption peak in a 615–640 nm region of an absorption curve as spectrophotometrically measured in N,N-dimethylformamide with absorbance adjusted from 1 to 2 Abs; and D represents a wavelength of an absorption peak in a 655–680 nm region of the absorption curve;

(6) A cyan dye mixture as set forth in (1) or (2), containing components having λmax in a 640–670 nm region, as measured by a high performance liquid chromatography having a photodiode array detector (developer: acetonitrile/aqueous solution of ammonium dihydrogenphosphate), in a total area percentage of not more than 50% of the overall area of all the components detected at a wavelength of 254 nm;

(7) A cyan dye mixture as set forth in (1) or (2), wherein a "ΣB/ΣA" value is not more than 1 wherein ΣA and ΣB each represent the sum of absorbances of all the detected components, provided that A represents an absorbance of an absorption peak in a 590–630 nm region as measured by a high performance liquid chromatography having a photodiode array detector (developer: acetonitrile/aqueous solution of ammonium dihydrogenphosphate); and B represents an absorbance of an absorption peak in a 640–670 nm region;

(8) A cyan dye mixture as set forth in (1) or (2), wherein the compounds consist of components having a "B/A" value of not more than 1 wherein A represents an absorbance of an absorption peak in a 590–630 nm region as measured by a high performance liquid chromatography having a photodiode array detector (developer: aqueous solution of acetonitrile/ammonium dihydrogenphosphate); and B represents an absorbance of an absorption peak in a 640–670 nm region;

(9) A water-based cyan ink composition comprising the cyan dye mixture set forth in any one of (1) to (8);

(10) A purification method for the cyan dye mixture set forth in (1) or (2), wherein a solution containing the cyan dye mixture set forth in (1) or (2) is precipitated with salt in a pH range of 7 to 11 thereby reducing absorbance in a 640–670 nm region as measured by a spectrophotometer;

(11) A purification method for the cyan dye mixture set forth in (1) or (2), which reduces absorbance in a 640–670 nm region as measured by a spectrophotometer, the method wherein the cyan dye mixture set fort in (1) or (2) is stirringly suspended in water-containing methanol, ethanol or 2-propanol, and then is filtered out;

(12) A water-based cyan ink composition containing the cyan dye mixture set forth in (1) or (2) which is purified by the method set forth in (10) or (11);

(13) A water-based cyan ink composition as set forth in (9) or (12), which is used for ink-jet recording;

(14) A water-based cyan ink composition set, wherein the water-based cyan ink composition set forth in any one of (9), (12) and (13) is used to prepare inks of two different concentrations, the ink of the higher concentration containing the dye mixture in concentrations of 2.5 to 7 wt %, the ink of the lower concentration containing the dye mixture in concentrations of 0.5 to 2.5 wt %;

(15) An ink-jet recording method for recording on a receiving material by jetting an ink droplet thereto in response to a recording signal, wherein the water-based cyan ink composition set forth in any one of (9), (12) and (13) is used as ink;

(16) An ink-jet recording method as set forth in (15), wherein the receiving material is an information transmission sheet;

(17) An ink-jet recording method as set forth in (15), wherein the receiving material is an information transmission sheet surface treated with at least one selected from the group consisting of inorganic substances and polymers;

(18) An ink-jet recording method as set forth in (15), wherein the receiving material is an information transmission sheet surface treated with at least one inorganic substance selected from the group consisting of silica, alumina and ceramics;

(19) An ink-jet recording method as set forth in (15), wherein the receiving material is an information transmission sheet surface treated with at least one polymer selected from the group consisting of hydrophilic polymers, acrylic polymers and urethane polymers;

(20) An ink-jet recording method as set forth in (15), wherein the receiving material is an information transmission sheet surface treated with at least one hydrophilic polymer selected from the group consisting of polyvinyl alcohol and polyvinylpyrrolidone;

(21) A container containing the water-based cyan ink composition set forth in any one of (9), (12) and (13);

(22) An ink-jet printer comprising the container set forth in (21); and

(23) A cyan dye mixture comprising a mixture of compounds which are represented by the following formula (1):

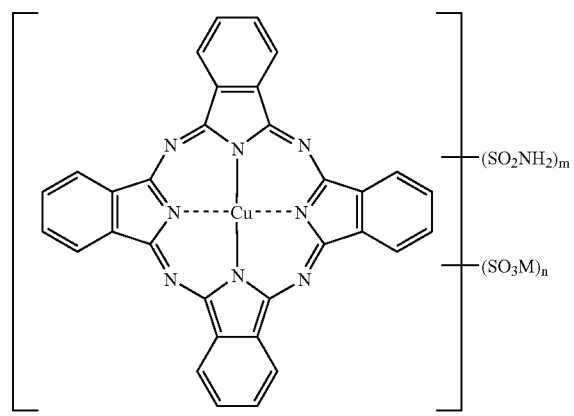

Formula (1)

wherein M represents a proton, alkali metal ion, alkaline earth metal ion, onium ion of an organic amine, or ammonium ion; m is an integer of 1 to 4; and n is an integer of 0 to 3; provided that m+n is an integer of 1 to 4; and containing a compound which has absorption peaks in a 615–640 nm region and 655–680 nm region of an absorption curve as spectrophotometrically measured in N,N-dimethylformamide with absorbance adjusted from 1 to 2 Abs and which has a "D-C" value of not more than 48 nm wherein C represents a wavelength of the absorption peak in the 615–640 region; and D represents a wavelength of the absorption peak in the 655–680 nm region.

DESCRIPTION OF SYMBOLS

Figure 1:
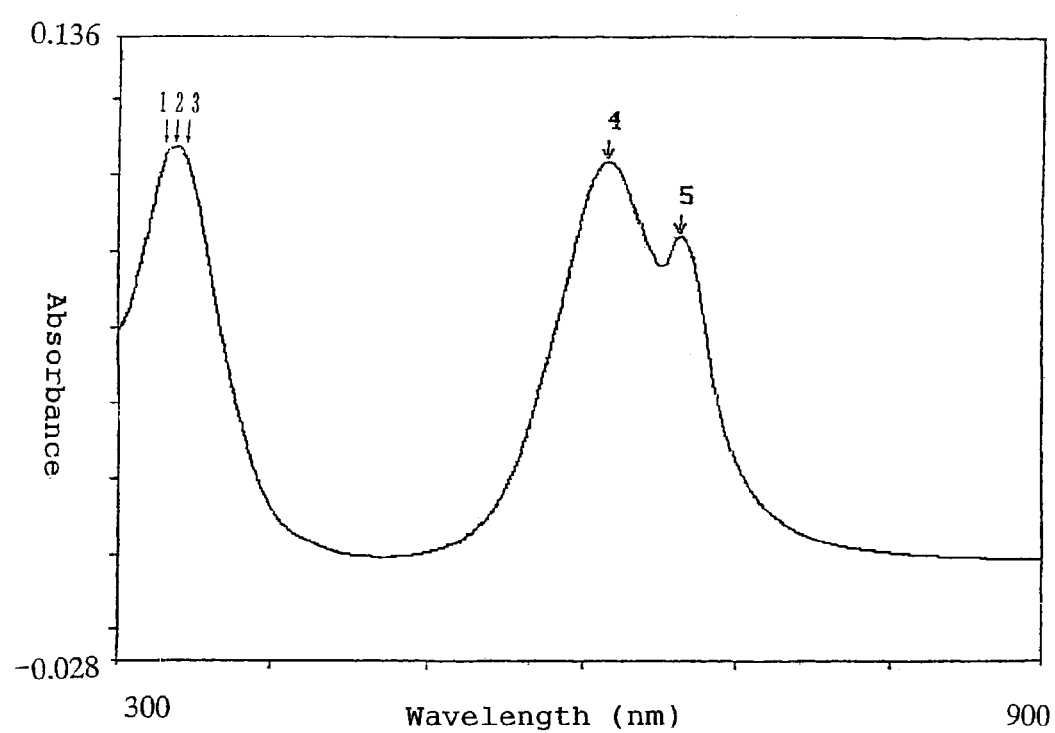
FIG. 1 is a graph representing an absorption curve of a salting-out filtrate having a pH of 10 according to Example 7.

In FIGS. 1 to 7, the abscissa represents the wavelength (nanometer) whereas the ordinate represents the absorbance. In FIGS. 8 to 11, the x axis represents wavelength (nanometer), the y axis represents mAU (absorbance/1000), and the z axis represents the time (minute).

BEST MODE FOR CARRYING OUT THE INVENTION

The invention will be described in detail.

A cyan dye mixture according to the invention is characterized by comprising a mixture of compounds represented by the aforesaid formula (1) or salts thereof which are obtained by reacting a chlorosulfonation product of copper phthalocyanine with an aminating agent in an amount of at least 2.5 mol per mol of the copper phthalocyanine or copper phthalocyanine sulfone as a starting material when the chlorosulhonation product is converted to a sulfonamids thereof. The cyan dye mixture of the invention is soluble in water and hence, is usable as a cyan color component for a water-based ink. The water-based cyan ink composition employing the cyan dye mixture of the invention is suitable for an ink composition for ink-jet printing.

The cyan dye mixture of the invention is soluble in water so that the dye mixture can be used as the cyan color component of the water-based ink. The use of the cyan dye mixture of the invention provides the cyan ink composition less prone to discolor or fade when allowed to stand under exposure to weather or ozone gas. The water-based cyan ink composition employing the cyan dye mixture of the invention is suitable for the ink composition for ink-jet printing.

Although the cyan dye mixture of the invention may be used as a mixture with any of the known cyan compounds (C. I. Direct Blue 86, C. I. Direct Blue 87, C. I. Acid Blue 9 or the like), it is more preferred to use the cyan dye mixture of the invention alone.

The cyan dye mixture of the invention is obtained by, for example, chlorosulfonating copper phthalocyanine (pigment) or copper phthalocyanine sulfone compound with chlorosulfonic acid or the like, and then reacting the chlorosulfonation product with an aminating agent in an amount of at least 2.5 mol per mol of the copper phthalocyanine (pigment) or copper phthalocyanine sulfone compound as a starting material. Where copper phthalocyanine (pigment) is the starting material, the cyan dye mixture of the invention may also be obtained by sulfonating copper phthalocyanine (pigment), chlorosulfonating the sulfonation product, and then reacting the resultant chlorosulfonation product with a predetermined amount of aminating agent. The procedures will specifically be described as below.

For instance, the chlorosulfonation of copper phthalocyanine (pigment) with chlorosulfonic acid normally is carried out in chlorosulfonic acid. In this process, chlorosulfonic acid may preferably be used in amount of 3–15 times relative to copper phthalocyanine (pigment) and more preferably 5–10 times by weight ratios. If chlorosulfonic acid is used in amount of 15 times or more by weight ratio, it is industrially disadvantageous although it does not cause any problems in chlorosulfonation. If chlorosulfonic acid is used in amount of less than 3 times, copper phthalocyanine does not dissolve completely in the acid so that insufficient stirring or abnormal reaction may result. The reaction temperature may normally range between 80 and 140° C., or preferably between 120 and 140° C. Although varied depending upon the reaction temperature, the reaction time may normally range between 30 minutes and 10 hours, or preferably between 1 and 6 hours.

After completion of the reaction, the reaction solution is poured into ice water and filtered to give a wet cake of chlorosulfonated copper phthalocyanine. The chlorosulfonated copper phthalocyanine thus obtained contains chlorosulfonic groups of 1 to 4 as substituents. The compounds obtained by the chlorosulfonation is a mixture of various compounds because it is possible for the group to substitute at plural positions.

In a case where the copper phthalocyanine sulfone compound represented by the formula (2) is chlorosulfonated with chlorosulfonic acid or the like, C. I. Direct Blue 86 or C. I. Direct Blue 87, generally known as copper phthalocyanine sulfonate, may be reacted in chlorosulfonic acid in amount of 3 to 15 times, preferably of 5 to 10 times relative to the copper phthalocyanine sulfonate by weight ratio at usually 30 to 140° C., preferably 50 to 120° C. of the reaction temperature to obtain the chlorosulfonation product. The reaction time normally ranges between 30 minutes and 10 hours or preferably between 1 and 6 hours, although it may vary depending upon the reaction temperature.

Subsequently, the chlorosulfonated copper phthalocyanine is reacted with an aminating agent to obtain the compound represented by the formula (1). The amount of aminating agent used is 2.5 times or more per mol of the starting material by a molar ratio. Examples of a usable aminating agent include, but not limited to, ammonium salts such as ammonium chloride, ammonium sulfate, preferably ammonium salts of inorganic acids, urea, ammonia water, ammonia gas and the like.

The resultant compounds may be separated by filtering after precipitating with acid or salting out.

The salting out may be performed in the range of neutral to alkaline, preferably at pH 7 to 11, thereby to remove byproducts accelerating the discoloration or fade. The temperature for the salting out is not particularly limited. However, the salting out may preferably be performed by heating the solution to normally 40 to 80° C., preferably to 50 to 70° C., followed by adding salt or the like.

As required, the separated compounds may be purified by desalting or the like so as to decrease inorganic salt contents. If the compounds are desalted with lower alcohol having 1 to 4 carbon atoms, preferably with alcohol having 1 to 3 carbon atoms or more preferably with methanol, ethanol or 2-propanol, the byproducts accelerating the discoloration or fade are also removed along with the salt and hence, an even more favorable cyan dye mixture can be obtained. Desalting with alcohol may preferably be performed by heating the solution nearly to a boiling point of a used alcohol, followed by cooling.

The compound synthesized by the above method is obtained normally as a compound free from $SO_3M$ (a compound of the formula (1) wherein n=0) or a mixture of a $SO_3M$-containing compound and a $SO_3M$-free-compound. The $SO_3M$-containing compound may be obtained in the form of a free acid or a salt thereof. The free acid of the compound may be formed by precipitating with acid, for example. The salt of the compound may be formed by salting out. If a desired salt cannot be obtained by salting out, a normal salt exchange process may be performed wherein a desired organic or inorganic base is added to a free acid of the compound.

In the compound of the formula (1), M represents a proton, alkali metal ion, alkaline earth metal ion, onium ion of an organic amine, or ammonium ion; m is an integer of 1 to 4; m+n is an integer of 1 to 4; n is an integer of 0 to 3; and n is preferably other than 0. Examples of an alkali metal giving the alkali metal ion represented by M include sodium, potassium, and lithium. Examples of an alkaline earth metal giving the alkaline earth metal ion include calcium, magnesium and the like. Examples of an organic amine include alkylamines like lower alkylamines having 1 to 4 carbon atoms such as methylamine and ethylamine; and alkanolamines like mono-, di- or tri-amines (lower alkanols having 1 to 4 carbon atoms) such as monoethanolamine, diethanolamine, triethanolamine, monoisopropanolamine, diisopropanolamine, and triisopropanolamine. Examples of a preferred M include proton; ammonium ion; alkali metal ions such as sodium ion, potassium ion, and lithium ion; alkanolamines such as monoethanolamine, diethanolamine, triethanolamine, monoisopropanolamine, diisopropanolamine, and triisopropanolamine; and preferably onium ions of mono-, di- and tri-(1 to 4 carbon atoms-lower alkanol) amines. However, the form of ion is not limited to the above.

The chlorosulfonated copper phthalocyanine may also be obtained by reacting the copper phthalocyanine in fuming sulfuric acid under heating for introducing sulfonic acid group therein, thereby forming copper phthalocyanine sulfone represented by the formula (2), and then reacting the sulfonic acid group with a chlorinating agent, such as thionyl chloride, phosphorous oxychloride, phosphorous pentachloride or chlorosulfonic acid to substitute the sulfonic acid group with chlorosulfone group.

A water-based ink composition of the invention is prepared using the cyan dye mixture of the invention (dye component) and water as a medium. Where the water-based ink composition is used with an ink-jet printer, it is preferred to use an ink composition wherein the dye component contains inorganic substances, such as chlorides of metal cations and sulfate, in lower contents. As rough standard, the total contents of sodium chloride and sodium sulfate in the cyan dye mixture is not more than 5 wt %, preferably of not more than 3 wt %, or more preferably of not more than 1 wt % and the said total contents in the ink composition is not more than 1 wt %. The dye components of the invention containing less inorganic substances can be prepared by desalting treatment, for example by the conventional method using a reverse osmosis membrane or by the method of stirring the dye components of the invention in a dry form or wet cake in a mixed solvent of methanol and water, filtering the solution and drying the filtered compounds and like.

Rather than relying upon the method using the reverse osmosis membrane, the inorganic substances may be more advantageously removed by desalting the dye components in the dry form or wet cake using alcohol. Specifically, the dye components are stirred in a mixed solvent of water and a lower alcohol having 1 to 4 carbon atoms or preferably alcohol having 1 to 3 carbon atoms, which is miscible in water, such as methanol, ethanol and 2-propanol, and then the dye components are filtered out and dried. The reason is that the latter method has a purifying effect. That is, compounds which have absorption peaks in a 640–670 nm region of an absorption curve measured by a spectrophotometer and bad effects with respect to the discoloration and fading are dissolved in the mixed solvent of alcohol and water, so that the byproducts having the absorption peaks in the 640–670 nm region of the absorption curve are filtered through and removed from the dye components.

The cyan dye mixture of the invention thus obtained is a dye mixture characterized by having λmax in a 590–630 nm region and substantially no absorption peak in the 640–670 nm region of the absorption curve as spectrophotometrically measured in water with concentrations thereof adjusted to 0.01 g/l.

The cyan dye mixture of the invention further contains a compound which has absorption peaks in 615–640 nm and 655–680 nm regions of an absorption curve as spectrophotometrically measured in N,N-dimethylformamide with absorbance adjusted from 1 to 2 Abs. The cyan dye mixture of the invention further contains a cyan dye compound having a "D-C" value (hereinafter expressed as "Δλ") of not more than 50 nm or preferably of not more than 48 nm, wherein C represents a wavelength of an absorption peak in a 615–640 nm region and D represents a wavelength of an absorption peak in a 655–680 nm region.

Where measured with a high performance liquid chromatography having a photodiode array detector (developer: acetonitrile/aqueous solution of ammonium dihydrogenphosphate), in the cyan dye mixture of the invention, at 254 nm of a detection wavelength, a total area percentage of components having λmax in a 640–670 nm region is not more than 50% or preferably of not more than 20% of the overall area of all the components detected and a "ΣB/ΣA" value is not more than 1 wherein ΣA and ΣB each represent the sum of absorbances of all the detected components, provide that A represents an absorbance of an absorption peak in a 590–630 nm region and B represents an absorbance at a absorption peak in a 640–670 nm region. Preferably, the above cyan dye mixture comprises a cyan dye compound consisting of components having B/A values of not more than 1.

The water-based ink composition of the invention is prepared using water as a medium.

The ink composition of the invention contains the mixture of compounds of the formula (1) in amount preferably of 0.1 to 20 wt %, more preferably of 0.1 to 10 wt % or even more preferably of 0.5 to 7 wt %. The water-based ink composition of the invention may further contain a water-soluble organic solvent or an ink preparing agent. The amount of the water-soluble organic solvent is in the range of 0 to 30 wt % or preferably of 10 to 30 wt %, whereas the amount of ink preparing agent is in the range of 0 to 5 wt % or preferably of 0 to 2 wt %. The remainder is water.

In order to increase the resolution of prints, the recent printers are provided with two kinds of cyan inks which include a higher concentration ink and a lower concentration ink. In the ink composition of the invention, the higher concentration ink contains the compound mixture of the formula (1) in preferred concentrations of 2.5 to 7 wt % or more preferably of 2.5 to 5 wt %, whereas the lower concentration ink contains the compound mixture (1) in preferred concentrations of 0.5 to 2.5 wt % or more preferably of 0.5 to 1.5 wt %.

The ink composition of the invention is prepared by admixing the compound mixture of the formula (1) and optionally the following water-soluble (or having solubility) organic solvent, ink preparing agent or the like into water removed of impurities, such as distilled water or ion-exchange water. Alternatively, the compound mixture of the formula (1) may be added and dissolved in a mixture including water and the following water-soluble organic solvent, ink preparing agent and the like. If necessary, the prepared ink composition may be filtered for removing unwanted foreign substances.

Examples of a usable water-soluble organic solvent include C1–C4 alkanols such as methanol, ethanol, propanol, isopropanol, butanol, isobutanol, secondary butanol, and tertiary butanol; carboxylic amides such as N,N-dimethylformamide and N,N-dimethylacetamide or preferably aliphatic N,N-di(C1–C4)alkyl(C1–C3)carboxylic amide; lactams such as ε-caprolactam and N-methylpyrrolidine-2-one or preferably 5–6 membered ring lactams; cyclic ureas such as urea, 1,3-dimethyl imidazoline-2-one, or 1,3-dimethyl hexahydropyrimide-2-one; ketones or ketone alcohols such as acetone, methyl ethyl ketone, and 2-methyl-2-hydroxypentane-4-one; 5–6 membered ring cyclic ethers preferably optionally substituted with hydroxy group such as (C1–C4)alkyl(C1–C4)alkylketone, tetrahydrofuran, and dioxane; mono-, oligo- or poly-alkylene glycols or thiogylcols having C2–C6 alkylene unit such as ethylene glycol, 1,2- or 1,3-propylene glycol, 1,2- or 1,4-butylene glycol, 1,6-hexylene glycol, diethylene glycol, triethylene glycol, dipropylene glycol, thiodiglycol, polyethylne glycol, and polypropylene glycol; polyols (triols) such as glycerin and hexane-1,2,6-triol; mono-C1–C4 alkyl ethers of polyhydroxy alcohol such as ethylene glycol monomethylether, ethylene glycol monoethylether, diethylene glycol monomethylether, diethylene glycol monoethylether, triethylene glycol monomethylether and triethylene glycol monoethylether; γ-butyrolactone; dimethyl sulfoxide. These water-soluble organic solvents may be used in combination of two or more types.

Examples of an advantageous organic solvent include N-methylpyrrolidine-2-one; urea; glycerin; mono-, di- or tri-alkylene glycol having C2–C6 alkylene unit or preferably mono-, di or tri-ethylene glycol and dipropylene glycol; and dimethyl sulfoxide. Among these, N-methylpyrrolidine-2-one, urea, glycerin, diethylene glycol and dimethyl sulfoxide are particularly preferred.

Examples of an ink preparing agent include a preservative and fungicide, pH adjuster, chelating agent, rust preventive, water-soluble UV absorber, water-soluble polymer, dye dissolving agent, and surface-tension modifier.

Examples of a usable preservative/fungicide include sodium dehydroacetate, sodium sorbate, sodium 2-pyridinethiol-1-oxide, sodium benzoate and sodium pentachlorophenol.

The pH of the ink composition of the invention preferably ranges between 6 and 11. Any pH adjuster that can regulate the pH of the ink in the range of 6 to 11 without adversely affecting the prepared ink composition may be used. Examples of a usable pH adjuster include alkanolamines such as diethanolamine and triethanolamine; alkali metal hydorxides such as lithium hydroxide, sodium hydroxide, and potassium hydroxide; ammonium hydroxide; and alkali metal carbonates such as lithium carbonate, sodium carbonate, and potassium carbonate.

Examples of a usable chelating agent include sodium ethylenediaminetetraacetate, sodium nitrilotriacetate, hydroxyethyl sodium ethylenediaminetriacetate, sodium diethylenetriaminepentaacetate, and uramil sodium diacetate. Examples of a usable rust preventive include acidic sulfite, sodium thiosulfate, ammonium thioglycolic acid, diisopropylammonium nitrite, pentaerythritol tetranitrate, and dicyclohexylammonium nitrite. Examples of a usable water-soluble polymer include polyvinyl alcohol, cellulose derivative, polyamine, and polyimine. Examples of a usable water-soluble UV absorber include sulfonated benzophenone and sulfonated benzotriazole. Examples of a usable dye dissolving agent include ε-caprolactam, ethylene carbonate, and urea. Examples of a usable surface-tension modifier include anionic, cationic and nonionic surface-tension modifiers known in the art.

According to an ink-jet recording method of the invention, examples of a usable receiving material include information transmission sheets such as paper and film; fabrics; and hide. Preferred information transmission sheets are those which are surface treated. Specifically, a preferred information transmission sheet may comprise any one of the aforesaid substrates and an ink receiving layer formed thereon. The ink receiving layer may be formed by applying a coating solution to the substrate surface, the coating solution containing inorganic fine particles capable of adsorbing the dye particles in the ink, such as silica, alumina, and ceramics, and a hydrophilic polymer such as polyvinyl alcohol or polyvinylpyrrolidone. The information transmission sheets formed with such an ink receiving layer are generally called specialty paper (film) for ink-jet printer or glossy paper (film) and are marketed under tradenames such as PICTRICO (available from Asahi Glass Co., Ltd.); Color BJ Paper, Color BJ Photo-Film Sheet, Professional Photopaper, Photo-Glossy Film (all available from Canon Inc.); Color Image-Jet Paper (available from Sharp Corporation); Superfine Specialty Glossy Film, PM Photo-Paper (all available from Seiko Epson Corporation); and Pictafine (available from Hitachi Maxell Ltd.).

The water-based ink composition of the invention is highly soluble in water and free from precipitation during storage. When used in the ink-jet printer, the water-based ink composition of the invention does not clog in ink-jet nozzles. When used over a relatively long period of time (repeatedly used in given cycles, or intermittently used at intervals), the water-based ink composition of the invention does not suffer changes in physical properties.

A container of the invention contains therein the above water-based cyan ink composition. An ink-jet printer of the invention features the container of the invention containing the water-based cyan ink composition set at an ink tank portion thereof.

The water-based ink composition of the invention features an almost ideal cyan color which is clear and close to the standard cyan color specified by JNC (Japan Printing Machinery Manufacturers Association). The ink composition of the invention is capable of rendering color tones in a wide visible region of the spectrum when used in combination with other magenta and yellow inks. In addition, the invention provides the cyan ink composition which is less prone to discolor or fade when allowed to stand under exposure to weather or ozone gas after printed on the glossy paper.

EXAMPLES

The invention will hereinbelow be described in more details with reference to the examples thereof. It is noted that terms "part" and "%" herein are based on mass unless otherwise specifically noted.

Example 1

(1) With stirring, 5.76 parts of copper phthalocyanine (pigment) was added, little by little, to 46.0 parts of chlorosulfonic acid at temperatures of not more than 70° C. and reaction was carried out at 140° C. for 4 hours. After completion of the reaction, the reaction solution was cooled and poured into 200 parts of ice water for discomposing the remaining chlorosulfonic acid. Precipitated crystals were filtered out and washed with 67 parts of ice water to give 44.7 parts of wet cake.

(2) Subsequently, 42.8 parts (content: 0.01 mol) of wet cake obtained at step (1) was added to 130 parts of ice water and stirred at 5 to 10° C. for 30 minutes. With temperature maintained at 5 to 10° C., 1.47 parts of ammonium chloride (ratio: 0.0275 mol per 0.01 mol of copper phthalocyanine (pigment)) was added to the mixture, which was adjusted to a pH of 10.0 to 10.5 with 10% caustic soda solution. Under these conditions, the mixture was reacted for 3 hours. With the pH maintained at 10.0 to 10.5, the mixture was further reacted at 25° C. for 1 hour and then at 60° C. for another 1 hour. The reaction solution was filtered to remove water-insoluble impurities thereby to obtain 360 parts of filtrate (reaction solution). The filtrate (reaction solution) was adjusted to a pH of 7.0 at 60° C. using 10% hydrochloric acid and then 72 parts of salt was added thereto little by little. After 30 minute stirring, precipitated crystals were filtered out to give 44.1 parts of wet cake.

(3) With stirring, 44.1 parts of wet cake obtained at step (2) was added to 200 parts of methanol and stirred at 60 to 65° C. for 1 hour. After cooling, crystals were filtered out and washed with 50 parts of methanol to give 29.4 parts of wet cake. The wet cake was added again to 150 parts of methanol. The resultant wet cake (20.5 parts) was dried to give 7.3 parts of cyan dye mixture of the invention (NaCl=2.6%, $Na_2SO_4$=0.1%).

Example 2

Similarly to Example 1, the chlorosulfonation was performed at 140° C. to obtain 43.7 parts of wet cake. The resultant wet cake was reacted with 1.77 parts of ammonium chloride (ratio: 0.033 mol per 0.01 mol of copper phthalocyanine) in the same way as Example 1 and then was purified in the same manner. Thus was obtained 7.1 parts of cyan dye mixture of the invention (NaCl=2.0%, $Na_2SO_4$=0.1%).

Example 3

Similarly to Example 1, the chlorosulfonation was performed at 130° C. to obtain 45.0 parts of wet cake. The resultant wet cake was reacted with 1.47 parts of ammonium chloride (ratio: 0.0275 mol per 0.01 mol of copper phthalocyanine) in the same way as Example 1 and then was purified in the same manner. Thus was obtained 7.0 parts of cyan dye mixture of the invention (NaCl=1.3%, $Na_2SO_4$=0.1%).

Example 4

(1) With stirring, 8.6 parts of copper phthalocyanine (pigment) was added, little by little, to 68.8 parts of chlorosulfonic acid at temperatures of not more than 70° C. and reaction was carried out at 140° C. for 4 hours. After completion of the reaction, the reaction solution was cooled and poured into 300 parts of ice water for discomposing the chlorosulfonic acid. Precipitated crystals were filtered out and washed with 100 parts of ice water to give 62.9 parts of wet cake.

(2) Subsequently, 31.5 parts (content: 0.00751 mol) of the wet cake obtained at step (1) was added to 100 parts of ice water and stirred at 5 to 10° C. for 30 minutes. With temperatures maintained at 5 to 10° C., 44.9 parts of 28% ammonium water (ratio: 0.986 mol per 0.01 mol of copper phthalocyanine) was added to the mixture, which was reacted for 3 hours while maintained at a pH of 10 to 10.5. With the pH maintained at 10 to 10.5, the mixture was further reacted at 25° C. for 1 hour and then at 60° C. for another 1 hour. The reaction solution was filtered to remove water-insoluble impurities thereby to obtain 270 parts of filtrate (reaction solution). The filtrate (reaction solution) was adjusted to a pH of 7.0 using 10% hydrochloric acid at 60° C. and then 54 parts of salt was added thereto little by little. After 30 minute stirring, precipitated crystals were filtered out to give 36.8 parts of wet cake. Again, 36.8 parts of wet cake was dissolved in water to give 200 ml in the total amount of the solution and the solution was used for salting out. That is, the solution was heated to 60° C. while 40 parts of salt was added thereto little by little. Precipitated crystals were filtered out to give 39.1 parts of wet cake.

(3) With stirring, 39.1 parts of the wet cake obtained at step (2) was added to 156 parts of methanol and stirred at 60 to 65° C. for 1 hour. After cooling, crystals were filtered out and washed with 50 parts of methanol to give 22.4 parts of wet cake. Again, the wet cake was added to 110 parts of methanol and stirred at 60 to 65° C. for 1 hour. After cooling, crystals were filtered out and washed with 50 parts of methanol. The resultant wet cake (14.8 parts) was dried to give 5.5 parts of the cyan dye mixture of the invention (NaCl=0.8%, $Na_2SO_4$=0.1%).

Example 5

(1) With stirring, 8.6 parts of copper phthalocyanine (pigment) was added, little by little, to 68.8 parts of chlorosulfonic acid at temperatures of not more than 70° C. and reaction was carried out at 140° C. for 4 hours. After completion of the reaction, the reaction solution was cooled and poured into 300 parts of ice water for discomposing the chlorosulfonic acid. Precipitated crystals were filtered out and the resultant wet cake in funnel was allowed to stand at 25° C. for 5 hours to give 63.7 parts of wet cake.

(2) Subsequently, 31.8 parts (content: 0.0075 mol) of wet cake obtained at step (1) was added to 75 parts of ice water and stirred at 5 to 10° C. for 30 minutes. With temperatures maintained at 5 to 10° C., 50.1 parts of 28% ammonium water (ratio: 1.100 mol per 0.01 mol of copper phthalocyanine) was added to the mixture little by little, which was reacted for 3 hours while maintained at a pH of 10 to 10.5. With the pH maintained at 10 to 10.5, the mixture was further reacted at 25° C. for 1 hour and then at 60° C. for another 1 hour. The reaction solution was filtered to remove water-insoluble impurities thereby to obtain 250 parts of filtrate (reaction solution). The filtrate (reaction solution) was adjusted to a pH of 7.0 at 60° C. using 10% hydrochloric acid and then 50 parts of salt was added thereto little by little. After 30 minute stirring, precipitated crystals were filtered out to give a wet cake. Again, the resultant wet cake was dissolved in water to obtain 200 ml of the solution in total amount. The salting out was performed by heating the solution to 60° C. while adding thereto 40 parts of salt little by little. Precipitated crystals were filtered out to give 26.8 parts of wet cake.

(3) With stirring, 26.8 parts of wet cake obtained at step (2) was added to 134 parts of methanol and stirred at 60 to 65° C. for 1 hour. After cooling, crystals were filtered out and washed with 50 parts of methanol to give 18.7 parts of wet cake. Again, the wet cake was added to 67 parts of methanol and stirred at 60–65° C. for 1 hour. After cooling, crystals were filtered out and washed with 50 parts of methanol. The resultant wet cake (6.9 parts) was dried to give 5.4 parts of cyan dye mixture of the invention ($NaCl=0.2\%$, $Na_2SO_4=0.1\%$).

Example 6

(1) 31.8 parts (content: 0.0075 mol) of wet cake obtained at step (1) of Example 5 was added to 75 parts of ice water and stirred at 5 to 10° C. for 30 minutes. 4.0 parts of ammonium chloride (ratio: 0.100 mol per 0.01 mol of copper phthalocyanine) was added thereto. With temperatures maintained at 5 to 10° C., aqueous solution of 10% caustic soda was added to the mixture which was reacted for 3 hours while maintained at a pH of 10.0 to 10.5. With the pH maintained at 10 to 10.5, the reaction was carried out at 25° C. for 1 hour and then at 60° C. for another 1 hour. The reaction solution was filtered to remove water-insoluble impurities to give 250 parts of filtrate (reaction solution). The filtrate (reaction solution) was adjusted to a pH of 7.0 using 10% hydrochloric acid at 60° C. and 50 parts of salt was added thereto little by little. After 30 minute stirring, precipitated crystals were filtered out to give a wet cake. Again, the resultant wet cake was dissolved in water. At this time, the solution was adjusted to an amount of 250 ml. The solution was heated to 60° C. while 50 parts of salt was added thereto little by little. After 30 minute stirring, precipitated crystals were filtered out to give 27.3 parts of wet cake.

(2) With stirring, 27.3 parts of wet cake obtained at step (1) was added to 137 parts of methanol and stirred at 60 to 65° C. for 1 hour. After cooling, crystals were filtered out and washed with 50 parts of methanol to give 15.7 parts of wet cake. Again, the wet cake was added to 65 parts of methanol and stirred at 60 to 65° C. for 1 hour. After cooling, crystals were filtered out and washed with 50 parts of methanol. The resultant wet cake (8.3 parts) was dried to give 5.2 parts of cyan dye mixture of the invention ($NaCl=0.1\%$, $Na_2SO_4=0.1\%$).

Example 7

(1) With stirring, 25.9 parts of copper phthalocyanine (pigment) was added, little by little, to 207.4 parts of chlorosulfonic acid at temperatures of not more than 70° C. and reaction was carried out at 140° C. for 4 hours. After completion of the reaction, the reaction solution was cooled and poured into 500 parts of ice water for discomposing the chlorosulfonic acid. Precipitated crystals were filtered out and the resultant wet cake in funnel was allowed to stand at 25° C. for 5 hours to give 198.4 parts of wet cake.

(2) Subsequently, 198.4 parts (content: 0.045 mol) of wet cake obtained at step (1) was added to 300 parts of ice water and stirred at 5 to 10° C. for 30 minutes. The solution was added with 24.1 parts of ammonium chloride (ratio: 0.100 mol per 0.01 mol of copper phthalocyanine). With temperatures maintained at 5 to 10° C., the solution was added with aqueous solution of 10% caustic soda and reacted for 3 hours while maintained at a pH of 10.0 to 10.5. With the pH maintained at 10–10.5, the mixture was further reacted at 25° C. for 1 hour and then at 60° C. for another 1 hour. The reaction solution was filtered to remove water-insoluble impurities thereby to obtain 1058 parts of filtrate (reaction solution).

(3) Then, 176 parts of filtrate (reaction solution) was adjusted to a pH of 10.0 at 60° C. and 36 parts of salt was added thereto little by little. After 30 minute stirring, precipitated crystals were filtered out and washed with 50 parts of 20% salt water to give 25.5 parts of wet cake. Again, the resultant wet cake was dissolved in water. At this time, the solution was adjusted to an amount of 180 ml and a pH of 10.0. The solution was heated to 60° C. and 36 parts of salt was added thereto little by little. After 30 minute stirring, precipitated crystals were filtered out and washed with 20% salt water to give 20.0 parts of wet cake.

(4) Then, 20.0 parts of wet cake thus obtained was dissolved in 100 parts of ion-exchange water and adjusted to a pH of 7.0. The solution was desalted by means of an RO membrane treatment system (manufactured by Millipore Inc.) thereby to obtain 103.8 parts of 4.4% aqueous solution, which was subjected to drying in an oven at 60° C. Thus was obtained 4.6 parts of cyan dye mixture of the invention ($NaCl=1.6\%$, $Na_2SO_4=0.1\%$).

Example 8

(1) 176 parts of reaction mixture obtained at step (2) of Example 7 was adjusted to a pH of 7.0 using 10% hydrochloric acid at 60° C. and then 36 parts of salt was added thereto little by little. After 30 minute stirring, precipitated crystals were filtered out and washed with 50 parts of 20% salt water to give 28.9 parts of wet cake. Again, the resultant wet cake was dissolved in water. At this time, the solution was adjusted to an amount of 180 ml and a pH of 7.0. The solution was heated to 60° C. and 36 parts of salt was added thereto little by little. After 30 minute stirring, precipitated crystals were filtered out and washed with 20% salt water thereby to give 25.3 parts of wet cake.

(2) Then, 25.3 parts of wet cake thus obtained was dissolved in 100 parts of ion-exchange water and adjusted to a pH of 7.0. The solution was desalted by means of the RO membrane treatment system (manufactured by Millipore Inc.) thereby to obtain 116.0 parts of 4.3% aqueous solution, which was subjected to drying in the oven at 60° C. Thus was obtained 5.0 parts of cyan dye mixture of the invention ($NaCl=1.2\%$, $Na_2SO_4=0.1\%$).

Example 9

(1) 352 parts of filtrate (reaction solution) obtained at step (2) of Example 7 was adjusted to a pH of 2.0 using 10% hydrochloric acid at 60° C. and then 72 parts of salt was added thereto little by little. After 30 minute stirring, precipitated crystals were filtered out and washed with 100 parts of 20% salt water to give 106.0 parts of wet cake. Again, the resultant wet cake was dissolved in water. At this time, the solution was adjusted to an amount of 360 ml and a pH of 2.0. The solution was heated to 60° C. and 72 parts of salt was added thereto little by little. After 30 minute stirring, precipitated crystals were filtered out and washed with 20% salt water thereby to give 89.0 parts of wet cake.

(2) Subsequently, 44.5 parts of wet cake thus obtained was dissolved in 100 parts of ion-exchange water and adjusted to a pH of 7.0. The solution was desalted by means of the RO membrane treatment system (manufactured by Millipore Inc.) thereby to obtain 111.3 parts of 4.4% aqueous solution, which was subjected to drying in the oven at 60° C. Thus was obtained 4.9 parts of the cyan dye mixture of the invention ($NaCl=0.6\%$, $Na_2SO_4=0.1\%$).

Example 10

44.5 parts of wet cake obtained at step (1) of Example 9 was added to 180 parts of methanol and stirred at 60 to 65° C. for 1 hour. After cooling, crystals were filtered out and washed with 50 parts of methanol to give 30.0 parts of wet cake. Again, the resultant wet cake was added to 150 parts of methanol and stirred at 60 to 65° C. for 1 hour. After cooling, crystals were filtered out and washed with 50 parts of methanol. The resultant wet cake (19.8 parts) was dried to give 6.1 parts of cyan dye mixture of the invention (NaCl=0.5%, $Na_2SO_4$=0.1%).

Example 11

(1) With stirring, 62.5 parts of copper phthalocyanine (pigment) was added, little by little, to 500 parts of chlorosulfonic acid at temperatures of not more than 70° C. and reaction was carried out at 140° C. for 4 hours. After completion of the reaction, the reaction solution was cooled and poured into 2500 parts of ice water for discomposing the chlorosulfonic acid. Precipitated crystals were filtered out to give 617.3 parts (0.11 mol) of wet cake.

(2) Subsequently, 617.3 parts of wet cake obtained at step (1) was added to 700 parts of ice water and stirred at 5 to 10° C. for 30 minutes. With temperatures maintained at 5 to 10° C., 54.8 parts of 28% ammonia water (0.821 mol per 0.01 mol of copper phthalocyanine) was added, little by little, to the solution, which was reacted for 3 hours while maintained at a pH of 10.0 to 10.5. With the pH maintained at 10 to 10.5, the mixture was further reacted at 25° C. for 1 hour and then at 60° C. for another 1 hour. The reaction solution was filtered to remove water-insoluble impurities thereby to obtain 1800 parts of filtrate (reaction solution). The filtrate (reaction solution) was heated to 60° C. and adjusted to a pH of 10.0 with 48% caustic soda while 400 parts of salt was added thereto little by little. After 30 minute stirring, precipitated crystals were filtered out to give 421.4 parts of wet cake.

(3) Then, 421.4 parts of wet cake thus obtained was dissolved in 1600 parts of ion-exchange water. The solution was desalted by means of an RO membrane treatment system (manufactured by Teijin Limited) thereby to obtain 736.4 parts of 10% aqueous solution, which was subjected to drying in the oven at 60° C. Thus was obtained 73.6 parts of cyan dye mixture of the invention (NaCl=0.5%, $Na_2SO_4$=0.1%).

Comparative Example 3

Similarly to Example 1, the chlorosulfonation was performed at 140° C. to obtain 42.8 parts of wet cake. The resultant wet cake was reacted with 1.18 parts of ammonium chloride (0.0022 mol per 0.01 mol of copper phthalocyanine (pigment)) in the same way as Example 1 and then was purified in the same manner. Thus was obtained 7.1 parts of cyan dye mixture for comparison (NaCl=2.0%, $Na_2SO_4$=0.1%).

Comparative Example 4

Similarly to Example 1, the chlorosulfonation was performed at 130° C. to obtain 46.0 parts of wet cake. The resultant wet cake was reacted with 1.18 parts of ammonium chloride (0.022 mol per 0.01 mol of copper phthalocyanine) in the same way as Example 1 and then was purified in the same manner. Thus was obtained 7.2 parts of cyan dye mixture for comparison (NaCl=2.0%, $Na_2SO_4$=0.1%).

Comparative Example 5

Similarly to Example 1, the chlorosulfonation was performed at 120° C. to obtain 44.0 parts of wet cake. The resultant wet cake was reacted with 0.88 parts of ammonium chloride (0.0165 mol) in the same way as Example 1 and then was purified in the same manner. Thus was obtained 7.2 parts of cyan dye mixture for comparison (NaCl=2.5%, $Na_2SO_4$=0.1%).

The dye mixtures of Examples 7–10 were synthesized using different methods for purifying the compounds.

Figure 2:
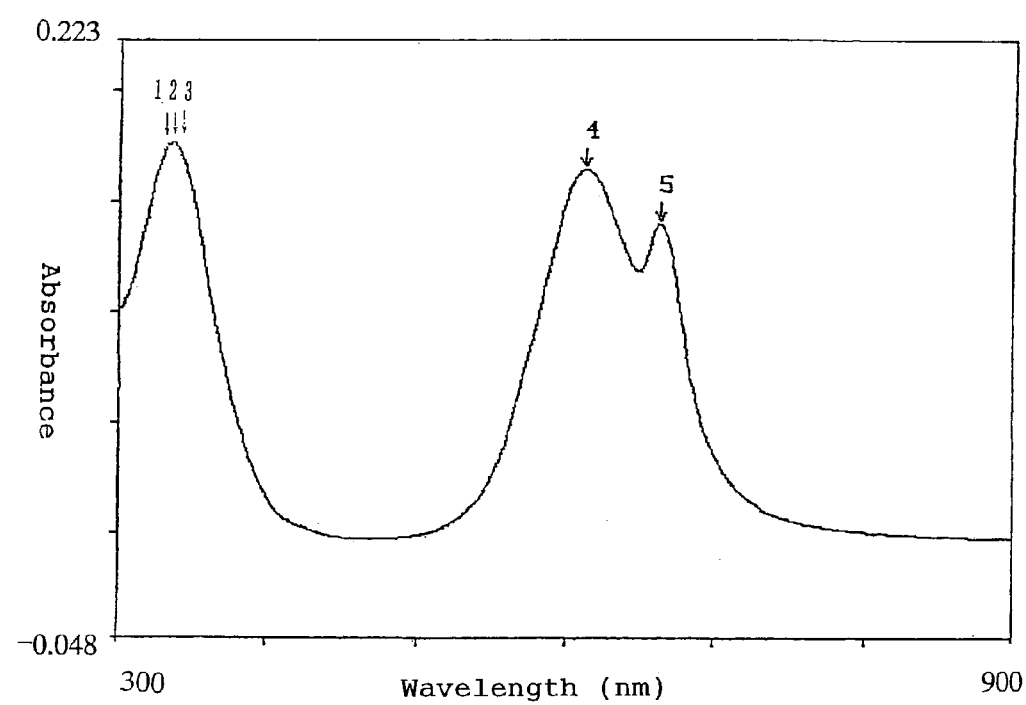
FIG. 2 is a graph representing an absorption curve of a salting-out filtrate having a pH of 7 according to Example 8.
Figure 3:
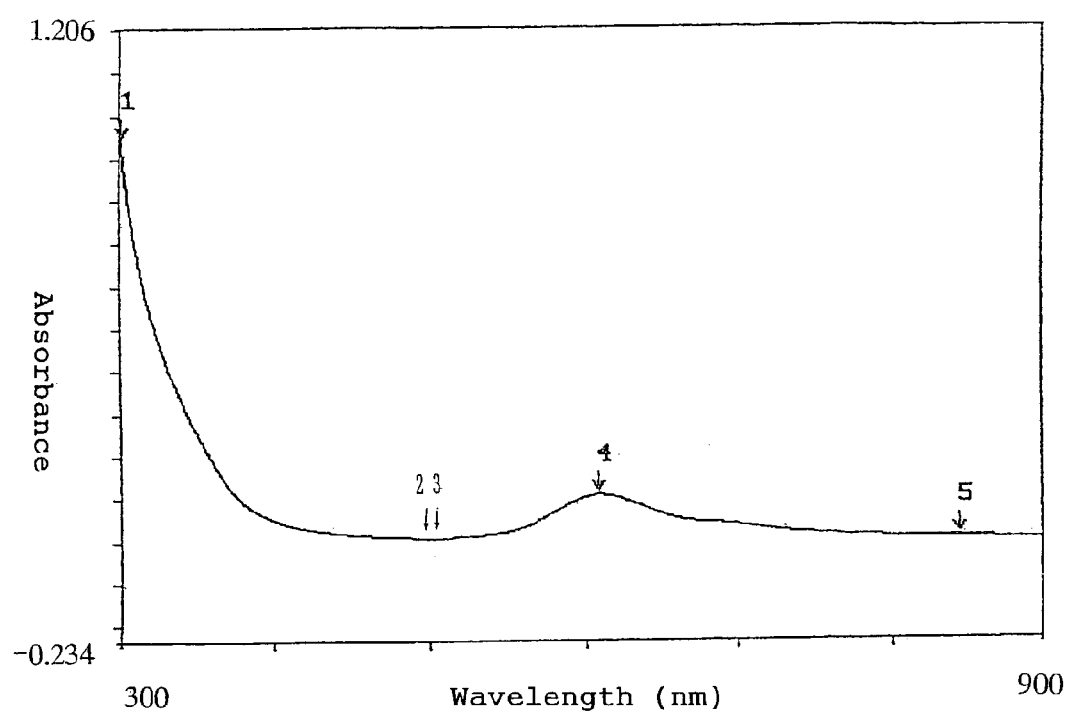
FIG. 3 is a graph representing an absorption curve of a salting-out filtrate having a pH of 2 according to Example 9.

The filtrates were obtained by these methods for purification, that is, by salting out the cyan dye mixtures of the present invention at respective pH of 10, 7 and 2 and then filtering, or by salting out the cyan dye mixtures of the present invention with methanol and then filtering. The resultant filtrates were measured by a spectrophotometer to obtain respective absorption curves thereof (in water). FIG. 1 shows an absorption curve of the filtrate having a pH of 10 used for salting out in Example 7; FIG. 2 shows an absorption curve of the filtrate having a pH of 7 used for salting out in Example 8; FIG. 3 shows an absorption curve of the filtrate having a pH of 2 used for salting out in Example 9; and FIG. 4 shows an absorption curve of the methanol filtrate in Example 10.

Figure 4:
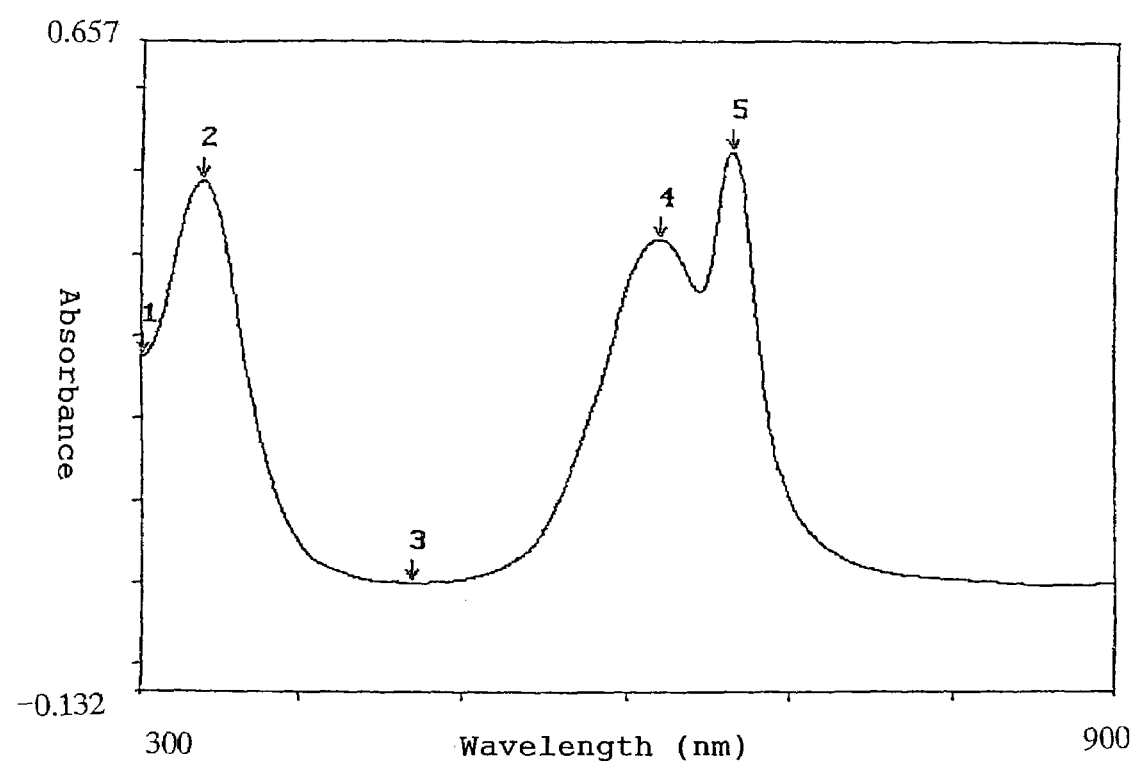
FIG. 4 is a graph representing an absorption curve of a methanol filtrate according to Example 10.

In the spectrophotometrically measured absorption curves (in water) of the filtrates, absorption peaks of byproducts are present in the 640–670 nm region, the byproducts potentially exerting adverse effects of the discoloration (FIG. 1: the salting-out filtrate at a pH of 10 in Example 7, FIG. 2: the salting-out filtrate at a pH of 7 in Example 8, FIG. 4: the methanol filtrate in Example 10). This shows that the by products having the absorption peaks in the 640–670 nm region and potentially exerting the adverse effects of the discoloration can be effectively removed by performing the salting-out using neutral to alkaline aqueous solution (having a pH in the range of 6 to 12 or preferably of 7 to 11, such as pH 7 or 10 in the above examples) or performing the desalting with methanol.

Figure 5:
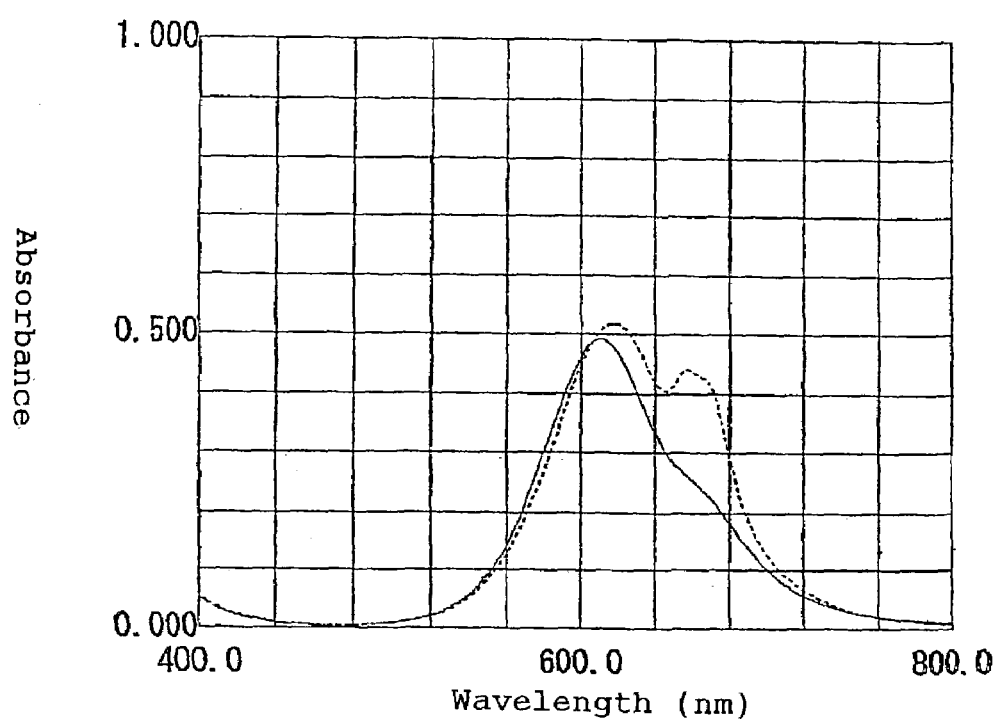
FIG. 5 is a graph representing absorption curves of Example 4 (solid line) and Projet Cyan 1 (Comparative Example 1, dotted line) as spectrophotometrically measured in water with concentrations thereof adjusted to 0.01 g/l.

FIG. 5 shows absorption curves of the cyan dye mixture of Example 4 of the invention and Projet Cyan 1 (Comparative Example 1) as spectrophotometrically measured in water with the concentrations thereof adjusted to 0.01 g/l.

As apparent from FIG. 5, the dye mixture of Example 4 has λmax in the 590–630 nm region and no peak in the 640–670 nm region. On the other hand, Projet Cyan 1 (Comparative Example 1) has a peak in the 640–670 nm region. That is, the cyan dye mixture of the invention is a dye mixture having λmax in the 590–630 nm region but no peak in the 640–670 nm region of the absorption curve as spectrophotometrically measured in water.

Figure 6:
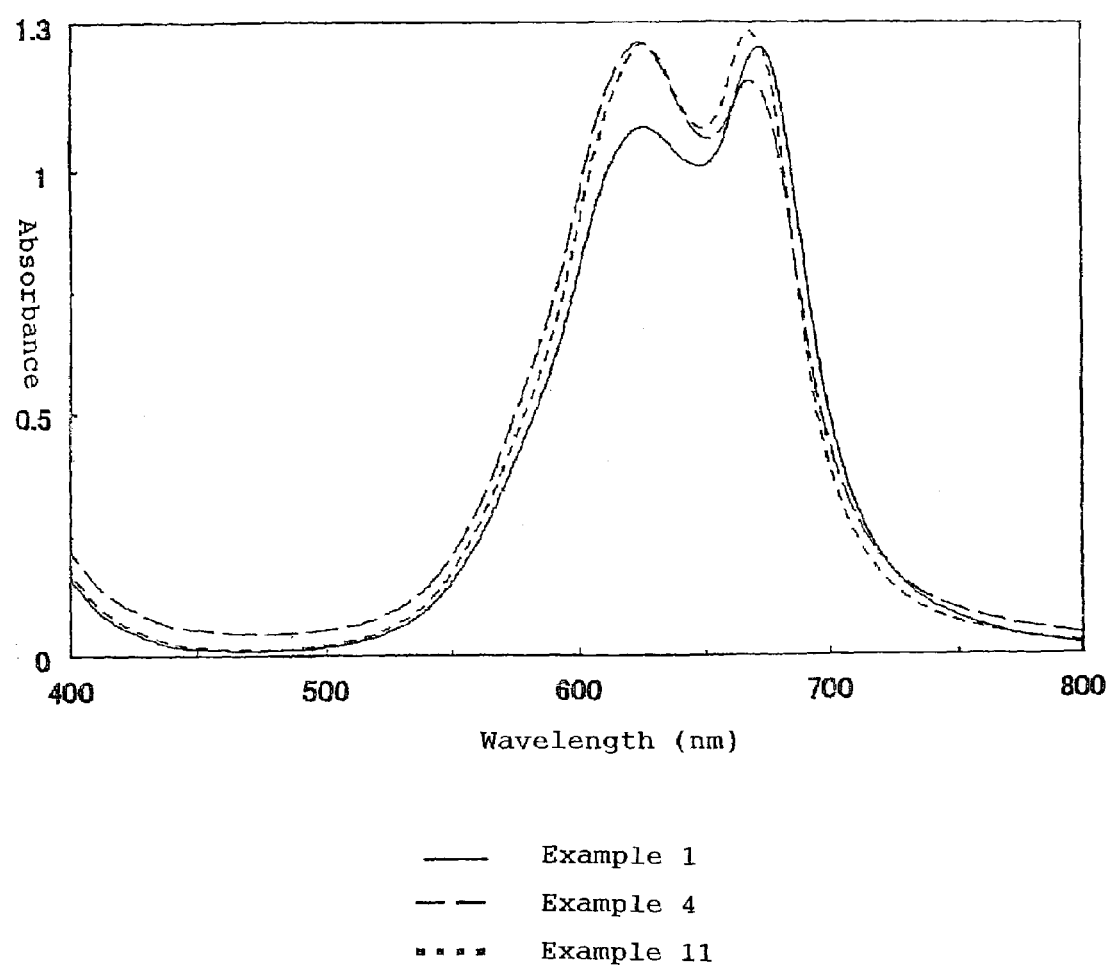
FIG. 6 is a graph representing absorption curves of dye mixtures measured in N,N-dimethylformamide, the mixtures obtained in Examples 1, 4 and 11.

Next, FIG. 6 shows absorption curves of the cyan dye mixtures of Examples 1, 4, 11 of the invention spectrophotometrically measured (in N,N-dimethylformamide with absorbance adjusted from 1 to 2 Abs). On the other hand, FIG. 7 shows for comparison an absorption curve of Projet Cyan 1 (Comparative Example 1) as spectrophotometrically measured under the same conditions.

Figure 7:
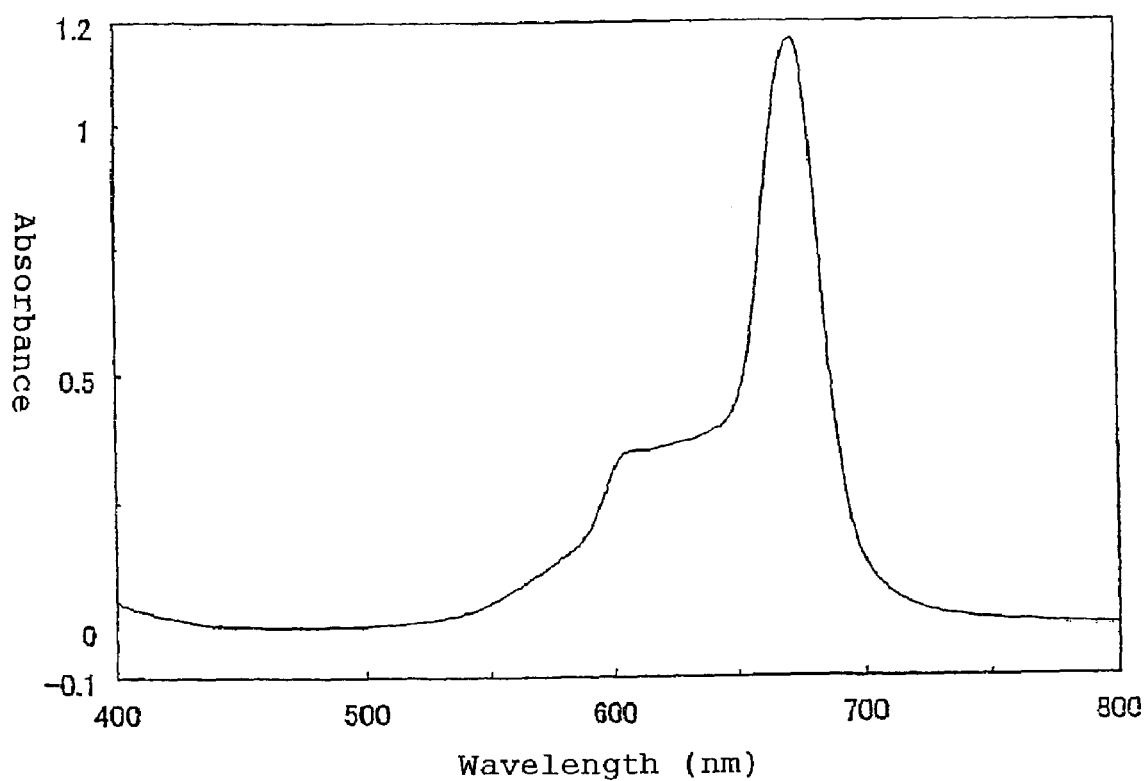
FIG. 7 is a graph representing an absorption curve of Comparative Example 1 measured in N,N-dimethylformamide.

According to a comparison between FIGS. 6 and 7, the compounds of Examples 1, 4 and 11 each has two absorption peaks in the 615–640 nm region and 655–680 nm, whereas Projet Cyan 1 (Comparative Example 1) presents a very low absorption in the 615–640 nm region but an extremely high absorption in the 655–680 nm region.

Figure 8:
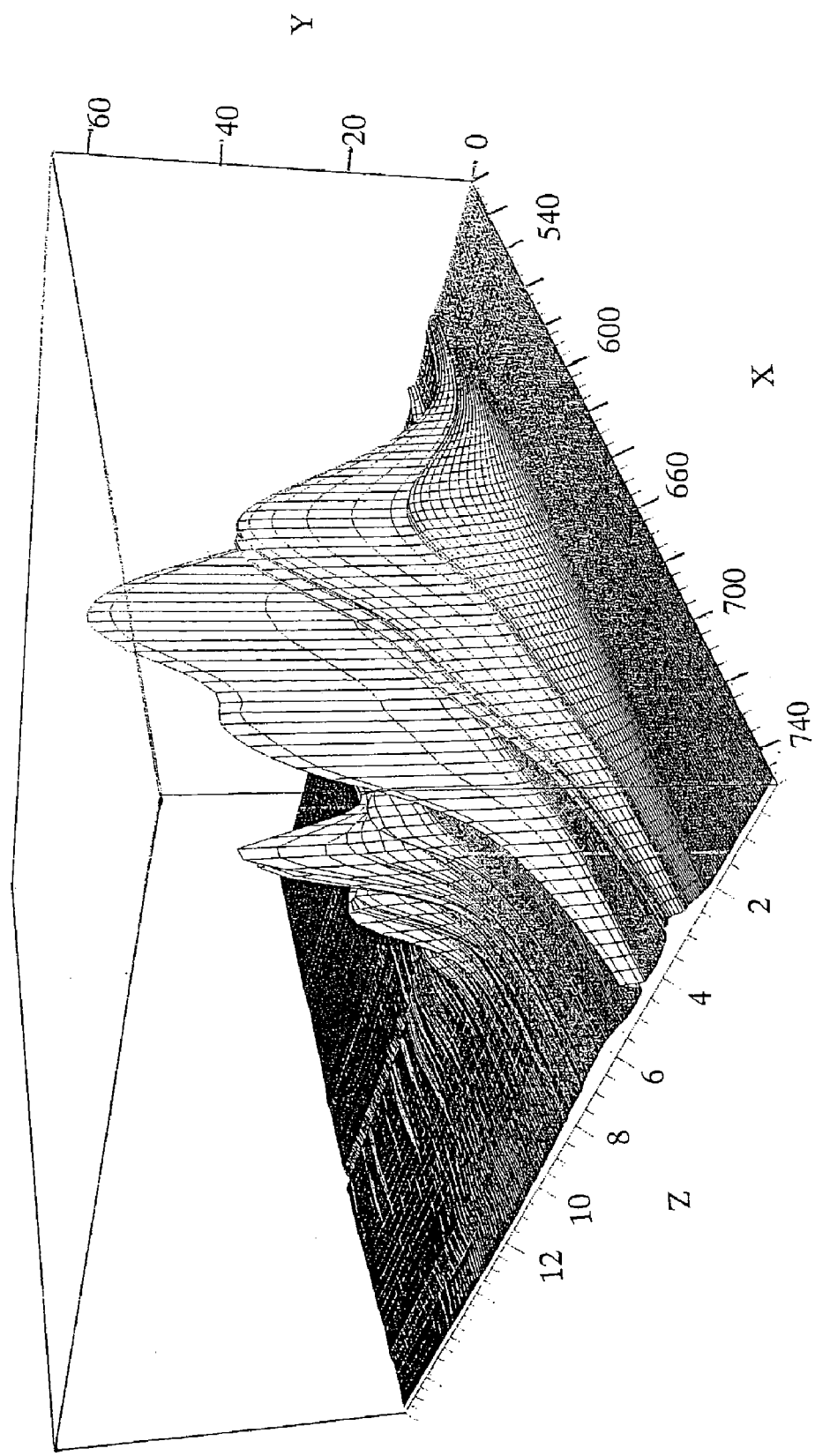
FIG. 8 is a graph representing measurement data of a dye mixture of Example 1 obtained by a high performance liquid chromatography.
Figure 9:
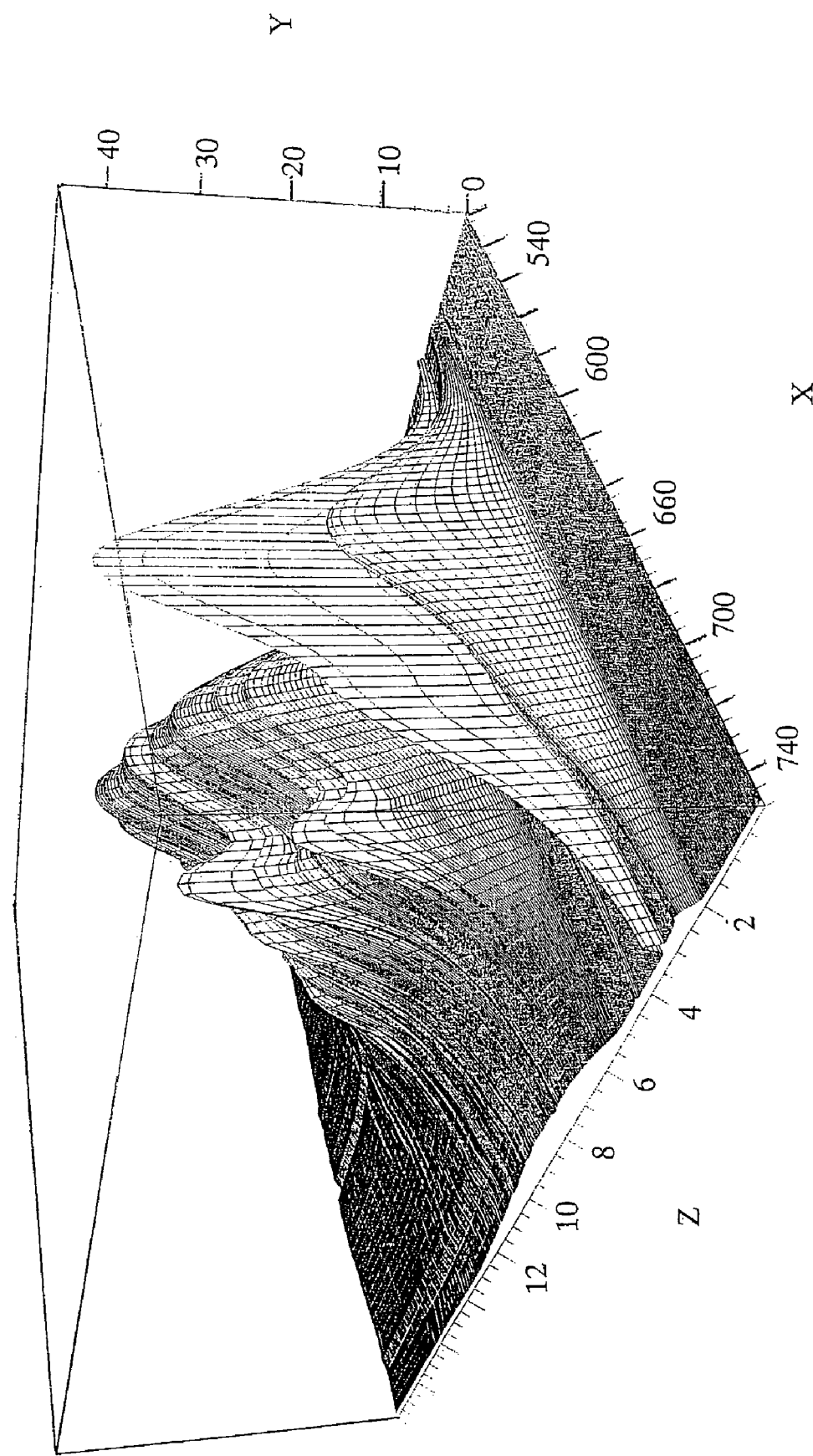
FIG. 9 is a graph representing measurement data of a dye mixture of Example 4 obtained by a high performance liquid chromatography.
Figure 10:
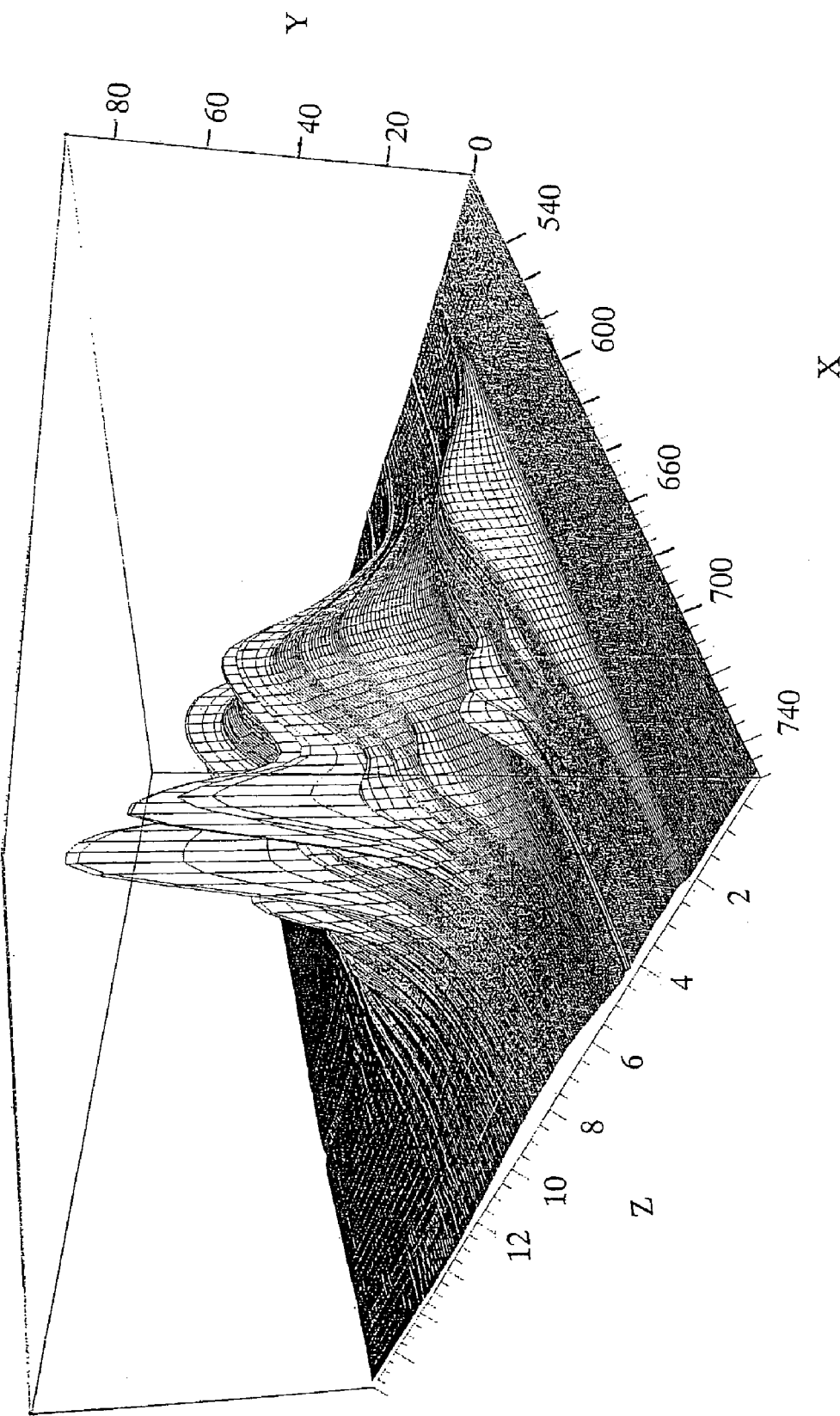
FIG. 10 is a graph representing measurement data of a dye mixture of Example 7 obtained by a high performance liquid chromatography.
Figure 11:
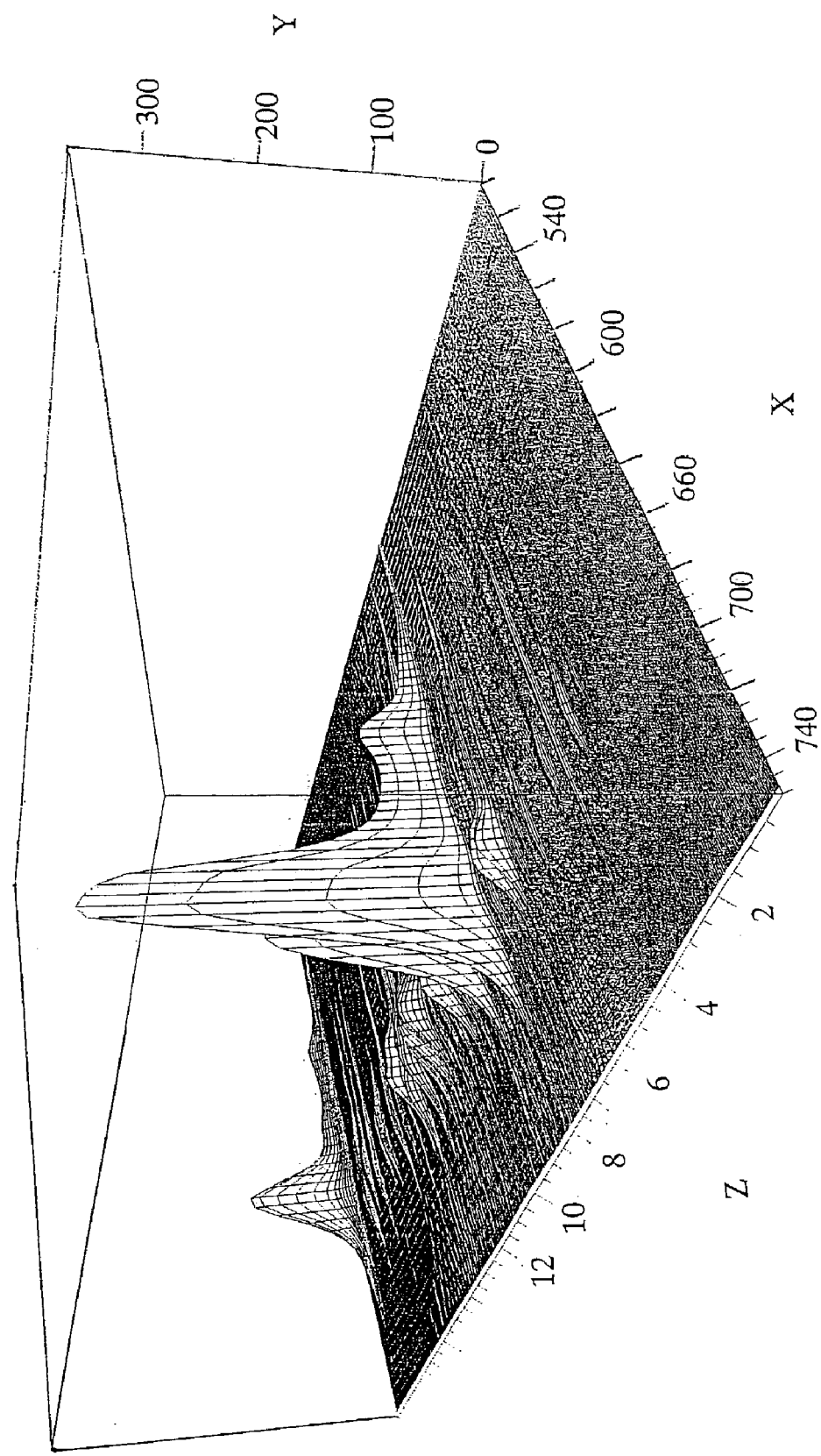
FIG. 11 is a graph representing measurement data of Projet Cyan 1 (Comparative Example 1, available from AVECIA. LTD.) obtained by a high performance liquid chromatography.

In addition, the cyan dye mixtures of Examples 1, 4 and 7 of the invention and Projet Cyan 1 (Comparative Example 1) were measured by a high performance liquid chromatography. The measurement data are shown in FIG. 8 (Example 1), FIG. 9 (Example 4), FIG. 10 (Example 7) and FIG. 11 (Comparative Example 1, Projet Cyan 1).

The above measurement with high performance liquid chromatography was performed under gradient method conditions at a detection wave length of 200 to 900 nm, using Hewlett-Packard 1100 series having a photodiode array detector, and acetonitrile/ammonium dihydrogenphosphate aqueous solution as a solvent.

The dye mixtures of Examples 1, 4, 7 each contains the components having λ max in the 640–670 nm region in a total area percentage of not more than 20% of the overall area of all the components detected at a detection wavelength of 254 nm, and each has a "ΣB/ΣA" value of not more than 1 wherein ΣA and ΣB each represent the sum of absorbances of all the detected components, provided that A represents an absorbance of an absorption peak in the 590–630 nm region; and B represents an absorbance of an absorption peak in the 640–670 nm region. Furthermore, the dye mixtures of Examples 1 and 4 each consist of the components having an B/A value of not more than 1. On the other hand, Projet Cyan 1 (Comparative Example 1) contains the components having λmax in the 640–670 nm region in a total area percentage of not less than 50% and has a "ΣB/ΣA" value of not less than 1.

(A) Preparation of Ink

The following ingredients listed in Table 1 below were blended together to dissolved and filtered through a 0.45-μm membrane filter (manufactured by ADVANTECH Co., Ltd.) to give a water-based ink composition for ink-jet printing. Incidentally, an ion-exchange water was used as water. Water and ammonium hydroxide were added in a manner to adjust the pH of the ink composition to 7 to 10 and the total amount thereof to 100 parts.

TABLE 1

| Dye mixture obtained by the above each example (desalted) | 0.5–7.0 parts |
| Water + ammonium hydroxide | 74.0–80.5 parts |
| Glycerin | 5.0 parts |
| Urea | 5.0 parts |
| N-methyl-2-pyrrolidone | 4.0 parts |
| IPA | 3.0 parts |
| Butyl carbitol | 2.0 parts |
| Total | 100.0 parts |

Cyan inks of comparative examples were adjusted to an optical density equal to that of cyan ink compositions containing the cyan dye mixture of the above examples. As the comparative examples, Projet Cyan 1 (Comparative Example 1, manufactured by AVECIA. LTD.) and C. I. Direct Blue 86 (Comparative Example 2, manufactured by Nippon Kayaku Co., Ltd.) were used.

In color printing, genuine brand name inks for Canon Ink-Jet Printer BJ F850 were used as a yellow ink, magenta ink and black ink.

(B) Ink-Jet Print

An ink-jet printer (Trade Name: PICTY80L, manufactured by NEC Corporation) or (Trade Name: BJ F850, manufactured by Canon Inc.) was operated to perform ink-jet recording on 4 types of receiving materials which included two types of commercial glossy papers surface treated with an inorganic substance and/or a polymer, Glossy Paper A (PM photo-paper KA420PSK, manufactured by Seiko Epson Corporation) and Glossy Paper B (Professional Photo-Paper PR-101 manufactured by Canon Inc.), and two types of commercial glossy films, Glossy Film A (Photo-Glossy Film HG-201, manufactured by Canon Inc.) and Glossy Film B (Specialty Glossy Film MJA4SP6, manufactured by Seiko Epson Corporation). Images recorded with the water-based cyan ink compositions of the invention and the cyan ink compositions of the comparative examples were evaluated for hue, vividness, hue changes under exposure to weather (ΔE), and hue changes under exposure to ozone gas (ΔE).

(C) Evaluation of Recorded Images

1. Hue Evaluation

Color, Hue and Vividness of Recorded Image: The color of each of the receiving papers was measured with GRETAG SPM 50 (trade name: GRETAG Inc.) for calculating L*a*b* values thereof. The hue was determined by comparison with the standard cyan color sample of the "JAPAN COLOR STANDARD PAPER" published by JNC (Japan Printing Machinery Manufacturers Association). The vividness was evaluated based on the C* value given by the expression $C^*=((a^*)^2+(b^*)^2)^{1/2}$.

2. Hue Changes Under Exposure to Weather (ΔE)

During a period between April and September, print samples were allowed to stand in a well ventilated shade away from direct sunlight for 7 or 10 days. At the end of the test, the above color measurement system was used to determine color difference between before and after the test. The color prints were visually inspected and evaluated according to the following criteria: O (minor hue changes), Δ (significant hue changes), x (very large color difference).

3. Hue Changes Under Exposure to Ozone Gas (ΔE)

Print samples were allowed to stand for 5 hours in an environment of an ozone concentration of 4 ppm at a temperature of 40° C. produced by means of an ozone weather meter. At the end of the test, the above color measurement system was used to determine the difference between colors before and after the test. The color prints were visually inspected and evaluated according to the following criteria: • (minor hue changes), Δ (significant hue changes), x (very large color difference).

First, the cyan dye mixtures synthesized in Examples 1–3 and comparative cyan dyes synthesized in Comparative Examples 3–5 were used according to the composition shown in Table 1 thereby to prepare respective inks of a dye concentration of 3%. Printing was carried out with the inks by PICTY80L and the resultant prints were tested as allowed to stand under exposure to weather. The results are listed in Tables 2 and 3 as below.

TABLE 2

Results of 7-day Exposure to Weather Test (ΔE)
(Glossy Film A)

| Amount of NH₄Cl | Chlorosulfonation Reaction Temperature | | |
|---|---|---|---|
| | 140° C. | 130° C. | 120° C. |
| 1.65 | | | 11.00 (CE 5) |
| 2.2 | 9.90 (CE 3) | 9.89 (CE 4) | |
| 2.75 | 9.04 (E 1) | 8.62 (E 3) | |
| 3.3 | 8.80 (E 2) | | |

Note:
NH₄Cl was used in equimolecular amount;
CE means comparative example; and
E means example.

TABLE 3

Results of 7-day Exposure to Weather Test (ΔE)
(Glossy Film B)

| Amount of | Chlorosulfonation Reaction Temperature | | |
|---|---|---|---|
| NH₄Cl | 140° C. | 130° C. | 120° C. |
| 1.65 | | | 12.97 (CE 5) |
| 2.2 | 10.03 (CE 3) | 10.31 (CE 4) | |
| 2.75 | 9.63 (E 1) | 9.13 (E 3) | |
| 3.3 | 7.47 (E 2) | | |

As apparent from the results listed in Tables 2 and 3, the use of the dye mixtures of the invention, wherein the dye mixtures were obtained by using ammonium chloride as the aminating agent in an amount of not less than 2.5 mol per mol of copper phthalocyanine (pigment) as the starting material, thereby increasing the sulfonamidation rate, achieves good results that the inks on the two types of receiving materials exhibit small hue degradations $\Delta E$ of not more than 10,. As rough standard, it is more preferred to use at least 2.5 mol of aminating agent per mol of the starting material because the inks on the two types of receiving materials achieve $\Delta E$ of 10 or less.

Next, images recorded with the cyan ink compositions of the present invention obtained in Examples 1 and 4–11 and with the ink composition for comparison (Comparative Example) were tested according to the above procedures 1–3 and evaluated for color, hue and vividness (hue evaluation), hue changes under exposure to weather ($\Delta E$), and hue changes under exposure to ozone gas ($\Delta E$). The results are listed in Table 4 as below.

It is noted that the concentration of the dye in ink was adjusted to 0.8% and PICTY80L was used for the printing operation. The ink composition of the comparative example was prepared using Projet Cyan 1 (Comparative Example 1) and in the same way as in the preparation of the ink compositions of the invention.

TABLE 4

| | Hue | | | Vividness | Exposure weather | Exposure ozone |
|---|---|---|---|---|---|---|
| | L* | a* | b* | (C*) | ΔE | ΔE |
| Example 1 | | | | | | |
| GP A | 67.3 | −42.8 | −41.8 | 59.8 | 10.4 | 8.0 |
| GF B | 67.3 | −41.9 | −45.7 | 62.0 | 14.5 | 9.8 |
| Example 4 | | | | | | |
| GP A | 66.4 | −39.7 | −45.7 | 60.5 | 6.7 | 4.9 |
| GF B | 66.9 | −39.6 | −47.1 | 61.5 | 9.5 | 7.7 |
| Example 5 | | | | | | |
| GP A | 67.7 | −39.3 | −44.2 | 59.1 | 8.6 | 7.1 |
| GF B | 68.4 | −39.2 | −45.2 | 59.8 | 10.4 | 7.4 |
| Example 6 | | | | | | |
| GP A | 68.5 | −39.9 | −41.4 | 57.5 | 8.6 | 7.5 |
| GF B | 68.7 | −39.5 | −44.7 | 59.7 | 13.2 | 8.3 |
| Example 7 | | | | | | |
| GP A | 68.0 | −39.5 | −42.1 | 57.7 | 8.6 | 7.1 |
| GF B | 68.1 | −39.7 | −45.0 | 60.0 | 12.5 | 8.0 |
| Example 8 | | | | | | |
| GP A | 69.3 | −39.4 | −40.9 | 56.8 | 9.1 | 7.5 |
| GF B | 68.9 | −39.6 | −44.3 | 59.4 | 14.8 | 8.8 |
| Example 9 | | | | | | |
| GP A | 68.6 | −40.4 | −41.1 | 60.4 | 9.3 | 8.0 |
| GF B | 68.2 | −40.3 | −44.9 | 60.3 | 15.4 | 9.1 |
| Example 10 | | | | | | |
| GP A | 69.3 | −39.8 | −40.7 | 56.9 | 8.6 | 7.0 |
| GF B | 69.2 | −39.8 | −44.0 | 59.3 | 13.6 | 8.0 |
| Example 11 | | | | | | |
| GP A | 68.0 | −39.3 | −44.2 | 59.1 | — | 3.1 |
| GF B | 67.5 | −39.1 | −45.6 | 60.1 | — | 5.7 |
| Comparative Example 1 | | | | | | |
| GP A | 68.4 | −44.3 | −37.6 | 58.1 | 16.8 | 15.3 |
| GF B | 68.5 | −42.0 | −44.1 | 60.9 | 22.5 | 20.0 |

Note:
GP means glossy paper; and
GF means glossy film.

The results of Table 4 show that the use of the compounds of the examples of the invention achieves good results that the inks suffer small discolorations ($\Delta E$) when allowed to stand under exposure to weather and small discolorations ($\Delta E$) when allowed to stand under exposure to ozone gas. This is a notable improvement from Projet Cyan 1 (Comparative Example 1) commonly used in the cyan inks for ink-jet printing.

The case where the compounds of Example 7 were used achieved better results with less discoloration than the case where the compounds of Example 9 were used. This indicates that the compounds adversely affecting the discoloration are removed by salting out in the neutral to alkaline solution or preferably having a pH in range of 7 to 11. According to a comparison between the uses of the compounds of Example 10 and Example 9, the desalting with methanol achieves better results with less discoloration. This suggests that the compounds adversely affecting the discoloration are also removed by alcohol such as methanol or preferably lower alcohols like those having 1 to 3 carbon atoms. In order to prove this, the filtrate used for salting out in Example 7 was precipitated with acid at pH 2 to separate the remaining cyan dye mixture in the filtrate. The separated cyan dye mixture was subjected to the ozone-gas exposure test. The $\Delta E$ on Glossy Paper A was 11.7 and that on Glossy Film B was 13.5, which were much worse than the data of Example 7. On the other hand, the filtrate of aqueous methanol solution used in Example 10 was precipitated with acid at pH 2 to separate the remaining cyan dye mixture. The cyan dye mixture was subjected to the above ozone-gas exposure test. The results were $\Delta E$ of 14.6 for Glossy Paper A and $\Delta E$ of 14.4 for Glossy Film B, which were much worse than the data of Example 10. The data also demonstrate that the impurities intensifying the discoloration under exposure to weather or ozone gas are effectively removed by salting out at the pH range of 7 to 11 or desalting with methanol.

Next, the cyan dye mixtures obtained in Examples 1 and 4–11 were measured in N,N-dimethylformamide by means of a spectrophotometer to obtain absorption curves thereof (absorbance adjusted from 1 to 2 Abs). There was determined the value of "D-C" ($\Delta \lambda$) wherein C represents a wavelength of the absorption peak in the 615–640 nm region; and D represents a wavelength of the absorption peak in the 655–680 nm region. The results are listed in Table 5 as below.

TABLE 5

| D–C(Δλ) Value | | |
|---|---|---|
| E.1: 46.5 | E.4: 44.4 | E.5: 43.8 |
| E.6: 44.9 | E.7: 44.2 | E.8: 45.2 |
| E.9: 45.1 | E.10: 44.9 | E.11: 42.2 |

Figure 12:
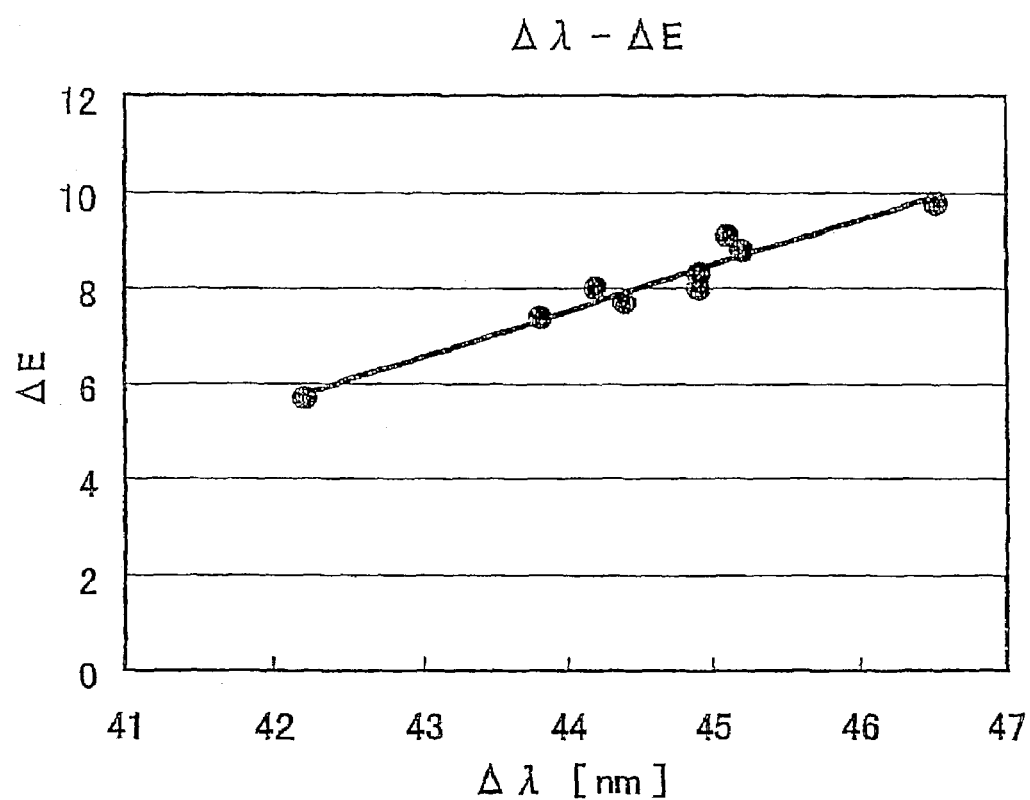
FIG. 12 is a graph representing a relation between Δλ and discoloration characteristic (ΔE) of the dye mixtures allowed to stand in an atmosphere of ozone gas.

In order to discuss correlation between Δλ listed in Table 5 and the discoloration (ΔE) under exposure to ozone gas, the correlation between the Δλ and the discoloration (ΔE) data on Glossy Film B is shown in FIG. 12.

Δλ and ΔE are plotted on the abscissa and on the ordinate, respectively. In the cyan dye mixtures obtained in Examples 1 and 4–11, Δλ and ΔE are in a proportional relationship indicating that the smaller is the Δλ value, the smaller is the discoloration under exposure to ozone gas. Thus, the compounds having smaller Δλ value may be used to improve the discoloration under exposure to ozone gas. Since the compounds synthesized using 2.75 mol of ammonium chloride has the Δλ value of 46.5, a measure of achieving the improvement is a Δλ of 48 or less.

Next, the cyan dye mixtures of Examples 1 and 4 were used to prepare a high-concentration cyan ink having a dye concentration of 4.0% and a low-concentration cyan ink having a dye concentration of 0.8%. The resultant inks were used with Ink-Jet Printer BJ F805 for color printing. A yellow ink, magenta ink and black ink used for this color printing were genuine brand name products for Canon Ink-Jet Printer BJ F850. The prints thus produced were tested as allowed to stand for 10 days under exposure to weather or ozone gas. The results of the weather exposure test are listed in Table 6 and the results of the ozone-gas exposure test are listed in Table 7. In the test, Projet Cyan 1 (Comparative Example 1) and C. I. Direct Blue 86 (Comparative Example 2) were used as comparative examples.

TABLE 6

| Test Inks Discoloration Test under 10-day Exposure to Weather | | | |
|---|---|---|---|
| ΔE after test GP A | Color print GP A | ΔE after test GP B | Color print GP B |
| E.4 | 9.9 | Δ-O | 9.1 | Δ-O |
| E.1 | 13.7 | Δ | 16.2 | Δ |
| CE.1 | 22.2 | x | 28.4 | x |
| CE.2 | 28.1 | x | 36.8 | x |

TABLE 7

| Test Inks Discoloration Test under 10-day Exposure to Weather | | | |
|---|---|---|---|
| ΔE after test GP A | Color print GP A | ΔE after test GP B | Color print GP B |
| E.4 | 8.1 | Δ-O | 7.2 | Δ-O |
| E.1 | 11.5 | Δ | 10.8 | Δ |
| CE.1 | 17.6 | x | 16.3 | x |
| CE.2 | 19.5 | x | 18.4 | x |

Note:
E means Example;
CE means Comparative Example;
GP A means Glossy Paper A; and
GP B means Glossy Paper B.

Tables 6 and 7 show that the cyan inks of the invention are optimum inks for ink-jet printing, producing color prints suffering extremely less discoloration as allowed to stand under exposure to weather or ozone gas in contrast to color prints produced using the cyan inks commonly used in the art.

As described above, the cyan inks of the invention are more suited for printing on the glossy paper and the glossy film than the cyan inks used in the art because the prints using the cyan inks of the invention suffer quite small discoloration when allowed to stand under exposure to weather or ozone gas.

INDUSTRIAL APPLICABILITY

The cyan compounds used in the cyan ink compositions of the invention have good storage stability without crystal deposition and change in physical properties or color after storage over an extended period of time. Where the ink composition of the invention is used as the cyan ink for ink-jet recording, the ink composition of the invention achieves excellent results with little discoloration, particularly when printed on the information transmission sheets having a surface treated with an inorganic substance and/or polymer, so-called glossy paper, and allowed to stand under exposure to weather or ozone gas. Furthermore, the ink composition of the invention exhibits a vivid, almost ideal cyan color on the print surface and hence, can render color tones in a wide visible region of the spectrum as used in combination with other magenta and yellow inks. Therefore, the ink composition of the invention is quite useful as the cyan ink for ink-jet recording.

The invention claimed is:

1. A cyan dye mixture comprising compounds which are represented by the following formula (1):

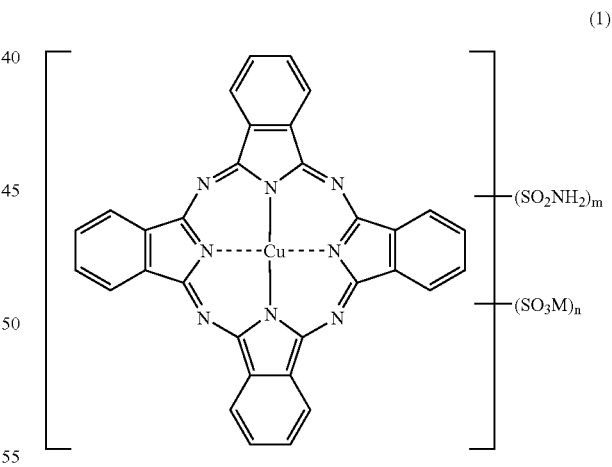

(1)

wherein M represents a proton, alkali metal ion, alkaline earth metal ion, onium ion of an organic amine, or ammonium ion; m is an integer of 1 to 4; n is an integer of 0 to 3; provided that m+n is an integer of 1 to 4, and which have λmax in a 590–630 nm region and no peak in a 640–670 nm region of an absorption curve as spectrophotometrically measured in water with concentrations thereof adjusted to 0.01 g/l.

2. A cyan dye mixture as claimed in claim 1, comprising a compound having a "D-C" value of not more than 48 nm wherein C represents a wavelength of an absorption peak in a 615–640 nm region of an absorption curve as spectrophotometrically measured in N,N-dimethylformamide with absorbance adjusted from 1 to 2 Abs, and D represents a wavelength of an absorption peak in a 655–680 nm region of the absorption curve.

3. A cyan dye mixture as claimed in claim 1, comprising components having λmax in a 640–670 nm region, as measured by a high performance liquid chromatography having a photodiode array detector (developer: acetonitrile/aqueous solution of ammonium dihydrogenphosphate), in a total area percentage of not more than 50% of the overall area of all the components detected at a wavelength of 254 nm.

4. A cyan dye mixture as claimed in claim 1, wherein a "ΣB/ΣA" value is not more than 1 wherein ΣA and ΣB each represent the sum of absorbances of all the detected components, provided that A represents an absorbance of an absorption peak in a 590–630 nm region as measured by a high performance liquid chromatography having a photodiode array detector (developer: acetonitrile/aqueous solution of ammonium dihydrogenphosphate); and B represents an absorbance of an absorption peak in a 640–670 nm region.

5. A cyan dye mixture as claimed in claim 1, wherein the compounds consist of components having a "B/A" value of not more than 1 wherein A represents an absorbance of an absorption peak in a 590–630 nm region as measured by a high performance liquid chromatography having a photodiode array detector (developer: acetonitrile/aqueous solution of ammonium dihydrogenphosphate); and B represents an absorbance of an absorption peak in a 640–670 nm region.

6. A water-based cyan ink composition comprising the cyan dye mixture claimed in any one of claims 1, 2, 3, 4, to 5.

7. A water-based cyan ink composition as claimed in claim 6, which is used for ink-jet recording.

8. A water-based cyan ink composition set comprising two inks of different concentrations wherein the inks are prepared by using the water-based cyan ink composition claimed in claim 6, and the ink of the higher concentration is adjusted to the concentrations in 2.5 to 7 wt % of the dye mixture, the ink of the lower concentration containing the dye mixture in concentrations of 0.5 to 2.5 wt %.

* * * * *